United States Patent
Rowley et al.

(10) Patent No.: US 10,738,921 B2
(45) Date of Patent: Aug. 11, 2020

(54) NON-METALLIC HIGH PRESSURE HIGH TEMPERATURE HIGH CHEMICAL COMPATIBILITY FLANGE ISOLATION GASKET

(71) Applicants: Marc Rowley, Tucson, AZ (US); Sigfrid Ruz, Denver, CO (US)

(72) Inventors: Marc Rowley, Tucson, AZ (US); Sigfrid Ruz, Denver, CO (US)

( * ) Notice: Subject to any disclaimer, the term of this patent is extended or adjusted under 35 U.S.C. 154(b) by 29 days.

(21) Appl. No.: 15/685,480

(22) Filed: Aug. 24, 2017

(65) Prior Publication Data

US 2018/0058616 A1 Mar. 1, 2018

Related U.S. Application Data

(60) Provisional application No. 62/379,383, filed on Aug. 25, 2016.

(51) Int. Cl.
*F16L 23/22* (2006.01)
*F16J 15/10* (2006.01)
(Continued)

(52) U.S. Cl.
CPC ............ *F16L 23/22* (2013.01); *B29C 70/32* (2013.01); *B29C 70/545* (2013.01);
(Continued)

(58) Field of Classification Search
CPC ......... F16J 15/064; F16J 15/104; F16L 23/18; F16L 25/026
See application file for complete search history.

(56) References Cited

U.S. PATENT DOCUMENTS

| 2,442,313 A | 5/1948 | Wayne |
| 2,789,847 A * | 4/1957 | Jackson ............ F16L 27/0828 |
| | | 277/382 |

(Continued)

FOREIGN PATENT DOCUMENTS

| WO | WO2006107798 A1 | 10/2006 |
| WO | WO2016003444 A1 | 1/2016 |

OTHER PUBLICATIONS

J. Zhang, Y. C. Xu, P. Huang Effect of cure cycle on curing process and hardness for epoxy resin eXPRESS Polymer Letters vol. 3, No. 9 (2009) 534-541 Available online at http://www.expresspolymlett.com/letolt.php?file=EPL-0001016&mi=c.

(Continued)

*Primary Examiner* — Eugene G Byrd
(74) *Attorney, Agent, or Firm* — Eugene Vamos

(57) ABSTRACT

A non-metallic flange isolation gasket kit sealing flanged pipeline connections and flanged vessel connections while providing electrical isolation protection between flanges suited for high-pressure and high-temperature cathodic protection applications is presented. The invention protects flange faces from media induced corrosion and mitigates flange rotation induced fatigue and failures. The invention comprises of a retainer, a seal, and a seal pre-load structural ring. The seal pre-load structural ring is inserted into the seal, and seal outer diameter surface is joined to the retainer inner diameter surface. A second embodiment comprises of a composite gasket blank, comprising of a retainer and a seal, and a seal pre-load structural ring. The seal outer diameter surface and the retainer inner diameter surface are joined by thermal fusion bonding. The invention may further comprise one or more gasket seating stress stabilizers and/or a centering ring. Tapered retainer upper and lower surfaces decrease flange rotation.

8 Claims, 33 Drawing Sheets

(51) Int. Cl.
*F16J 15/06* (2006.01)
*B29C 70/68* (2006.01)
*B29C 70/74* (2006.01)
*B29C 70/32* (2006.01)
*B29C 70/54* (2006.01)
*F16L 25/02* (2006.01)
*F16L 23/18* (2006.01)
*B29K 63/00* (2006.01)
*B29L 31/26* (2006.01)
*B29K 627/18* (2006.01)

(52) U.S. Cl.
CPC ............ *B29C 70/683* (2013.01); *B29C 70/74* (2013.01); *F16J 15/064* (2013.01); *F16J 15/102* (2013.01); *F16J 15/104* (2013.01); *F16J 15/108* (2013.01); *F16L 23/18* (2013.01); *F16L 25/026* (2013.01); *B29K 2063/00* (2013.01); *B29K 2627/18* (2013.01); *B29L 2031/265* (2013.01)

(56) References Cited

U.S. PATENT DOCUMENTS

| | | | | |
|---|---|---|---|---|
| 3,302,953 | A * | 2/1967 | Glasgow | F16J 15/127 277/611 |
| 3,698,728 | A * | 10/1972 | Walker | F16J 15/104 277/612 |
| 3,704,021 | A * | 11/1972 | Barbarin | F16J 15/104 277/611 |
| 3,720,420 | A * | 3/1973 | Jelinek | F16J 15/104 277/638 |
| 3,905,090 | A * | 9/1975 | Painter | B21D 53/20 228/164 |
| 4,348,032 | A * | 9/1982 | Hanson | F16J 15/123 277/594 |
| 4,618,154 | A * | 10/1986 | Freudenthal | F16J 15/3236 277/530 |
| 5,316,320 | A | 5/1994 | Breaker | |
| 5,518,257 | A * | 5/1996 | Breaker | F16J 15/127 277/612 |
| 5,890,719 | A * | 4/1999 | Bettencourt | F02F 11/002 277/599 |
| 6,039,319 | A * | 3/2000 | Coonce | F16L 23/22 277/314 |
| 6,234,545 | B1 * | 5/2001 | Babuder | F16L 23/10 277/608 |
| 6,402,159 | B1 * | 6/2002 | Kohn | F16L 23/16 277/608 |
| 6,547,255 | B1 * | 4/2003 | Donaway | F16L 19/0212 210/445 |
| 6,869,081 | B1 * | 3/2005 | Jenco | F16L 23/003 277/611 |
| 9,745,046 | B2 * | 8/2017 | Harrison | B64C 1/1492 |
| 2002/0074798 | A1 * | 6/2002 | Duzick | F16J 15/061 285/379 |
| 2007/0210528 | A1 * | 9/2007 | Baber | F16J 15/104 277/549 |
| 2007/0236008 | A1 * | 10/2007 | Kim | F16L 23/18 285/206 |
| 2008/0130260 | A1 * | 6/2008 | Kouda | F16J 15/064 361/818 |
| 2010/0059988 | A1 * | 3/2010 | Matsumoto | F16L 17/073 285/148.28 |
| 2011/0156352 | A1 * | 6/2011 | Bond | F16J 15/064 277/312 |
| 2011/0266755 | A1 | 11/2011 | Anderson | |
| 2013/0087358 | A1 * | 4/2013 | Leslie | F16J 15/061 174/50 |
| 2014/0312570 | A1 * | 10/2014 | Foster | F16J 15/06 277/312 |
| 2014/0360772 | A1 * | 12/2014 | Coppola | F16J 15/064 174/390 |
| 2016/0102793 | A1 * | 4/2016 | Shimizu | F16L 23/02 285/368 |
| 2017/0009918 | A1 * | 1/2017 | Koves | F16J 15/20 |
| 2017/0321831 | A1 * | 11/2017 | Nahrwold | F16J 15/061 |
| 2018/0299044 | A1 * | 10/2018 | Brown | F16L 23/18 |

OTHER PUBLICATIONS

Emily Ho Elastomeric seals for rapid gas decompression applications in high pressure services Reserach Report 485. BHR Group Limited for the UK Health and Safety Executive 2006 Available online at http://www.hse.gov.uk/research/rrpdf/rr485.pdf.

* cited by examiner

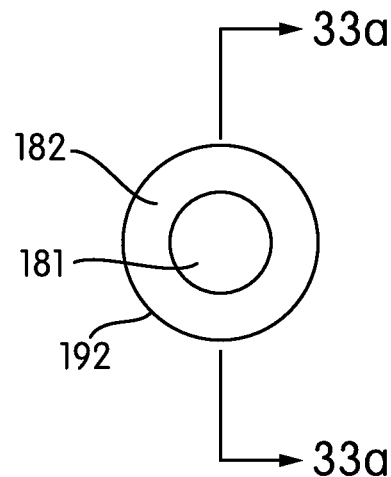
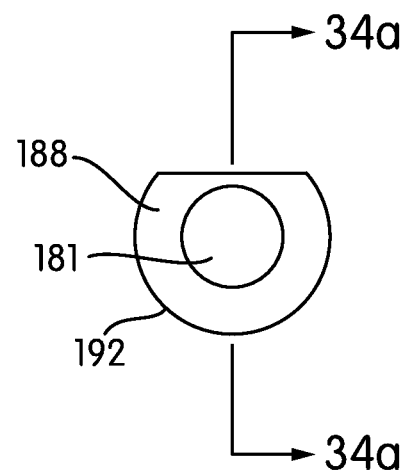
FIG. 33    FIG. 34
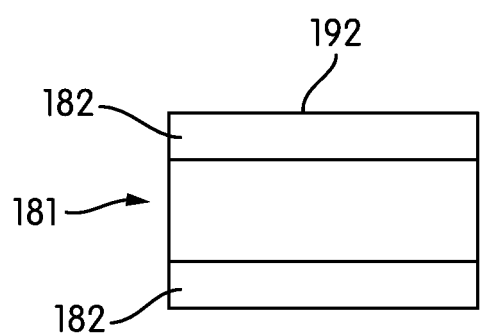
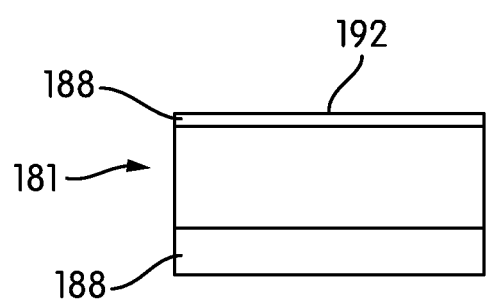
FIG. 33a    FIG. 34a

NON-METALLIC HIGH PRESSURE HIGH TEMPERATURE HIGH CHEMICAL COMPATIBILITY FLANGE ISOLATION GASKET

CROSS-REFERENCE TO RELATED APPLICATIONS

This application claims the priority benefit of U.S. Provisional Patent Application Ser. No. 62/379,383 filed Aug. 25, 2016.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A "SEQUENCE LISTING," A TABLE, OR A COMPUTER

Not Applicable

BACKGROUND OF THE INVENTION

(1) Field of Invention

A non-metallic flange isolation gasket kit that seals flanged pipeline connections and flanged vessel connections while providing electrical isolation protection between flanges is presented. The non-metallic flange isolation gasket kit can be used in high pressure and high temperature cathodic protection applications without the need for metal components. The non-metallic flange isolation gasket kit protects flange faces from media induced corrosion and mitigates flange rotation induced fatigue and failures.

(2) Description of Related Art

Flanged connections are used on processing equipment, tanks, and sections of pipelines for securing flow of liquid and gaseous fluids. In some cases, these fluids and gases are explosive and/or have toxic properties that can pose a substantial risk to human life in case of leaks. Cathodic protection systems that prevent equipment corrosion have been developed to extend the life of processing and pipeline equipment. These systems require the use of a flange isolation kit (FIK) between flange faces to break off sections of pipeline to maintain corrosion system effectiveness. A flange isolation kit comprises of a flange isolation gasket and a bolt isolation kit. The gasket comprises of a core, also called a retainer, and optionally, sealing elements. The bolt isolation kit comprises of non-metallic or coated metallic washers, bolts, and bolt sleeves. The components of flange isolation kits are electrically isolating so that electrical current does not pass from one flange to the other.

Retainers are most often made from a metal core, typically stainless steel. High-pressure thermoset plastic laminate, typically glass reinforced epoxy (GRE), is bonded to each side of the metal core, creating a three-layer composition structure (laminate/metal core/laminate). The glass reinforced epoxy has a temperature limit of 400 degrees Fahrenheit. Sealing elements, such as spring energized face seals, can be inserted within grooves in the retainer, providing sealing properties to the flange isolation gasket. Examples of spring energized face seals include GPT VCS™ and Lamons Defender™. These spring energized face seals can withstand high pressures, up to ANSI B16.5 class 2500 and (GPT only) API 6A 10000. Typical thermoset resin systems used to bond the high-pressure plastic laminates to the metal core include epoxy, silicone, melamine, and phenolic. The metal core is said to provide increased strength at elevated pressures by supporting the sealing elements to provide concentric tensile strength, also referred to as radial or hoop strength. FIG. 1 shows prior art of the invention, namely a cross section of a flange isolation kit joining two flanges. A flange isolation gasket is placed between two flange faces. The retainer is created from a three-layer composition structure. A circular concentric groove is present in both the upper and the lower face of the retainer. Sealing elements are inserted in each of the grooves. FIG. 1a is an enlarged cross section view of the flange isolation gasket depicted in FIG. 1.

Sealing elements in currently available flange isolation gaskets are required to be small in size, both in their thickness and width. Retainer thickness requirements and the retainer's multi-layer design require the thickness of sealing elements to be typically around 0.120" or less. A number of factors also limit the width of currently available seal elements. First, sealing elements must be supported on three sides. Second, sealing elements have to be placed in a very specific area of the flange face, between the inner diameter (ID) of the flange and the inner diameter of a ring type joint. These factors prevent sealing elements to be more than 0.100" in width. When using a spring energized seal design, approximately half of the volume of these 0.120"× 0.100" sealing elements is removed to make a spring cavity. These size and volume constraints prevent currently available sealing elements to have the mechanical properties necessary to sustain high pressures over long periods of time.

Retainers made from a metal core have numerous weaknesses. The presence of a metal core at the inner diameter of the retainer compromises electrical isolation between flange connectors. Electrical resistance is directly proportional to the thickness of the laminate layer, which creates an electrical isolation gap between the flange connectors and the metal core. The laminate layer is approximately 0.090" thick or less, providing limited isolation properties between flange faces; fluids flowing through the pipeline can easily bridge this gap, limiting the efficiency of a cathodic protection system with a flange isolation kit.

The three-layer composition of currently available retainers inherently creates a design with large manufacturing process variations, (+/−0.020") at a minimum. The large manufacturing process variations from individual layers is magnified when the individual layers are combined. This three-layer composition creates significant manufacturing process variation stack-up that compromises seal efficiency in flange isolation gaskets; this large manufacturing process variation stack-up leads to non-uniform retainer thickness. In opposed-face-seal retainers, sealing element grooves are cut in either side of the retainer, where the groves are aligned opposite each other. FIGS. 1 and 1a show a retainer with an opposed-face-seal design. The sealing elements are placed within the sealing elements grooves of the retainer. In opposed-face-seal design retainers, if the three-layer composition thickness is too narrow, the sealing element grooves will be deep in the metal core and reduce the metal core between the sealing elements to approximately 0.060". This thin metal core can become a failure point. In opposed-face-seal design retainers, if the three-layer composition thickness is too thick, the sealing element grooves will be very shallow in the metal core; the metal core will not provide support for the sealing elements. There will be 0.020" of metal to provide concentric support for a 0.120" sealing element. This means the plastic laminate supports the sealing element under pressure rather than the metal core. Since the plastic laminate only has bi-directional strength, it cannot support the sealing elements in high pressure/high temperature applications. For inner diameter seals, if the three-layer composition thickness is too narrow, the sealing elements will be compressed beyond the sealing element's optimal operating parameters. Sealing elements do not have a 0.040" sealing range. For inner diameter seals, if the three-layer composition thickness is too thick, the sealing element will not be compressed enough to function properly.

Seal compression is one of the most important performance criteria in seal design in flange isolation gaskets. A number of factors affect seal compression. The flow of corrosive fluids through the pipeline degrades the flange face, reducing flange life expectancy. An inner diameter seal can be over-compressed, causing seal extrusion and spring damage. An inner diameter seal can be under-compressed, compromising performance drastically. Deteriorated seal compression increases susceptibility to explosive decompression. Explosive decompression is the uncontrolled depressurization of a fluid in pipelines utilizing flange isolation kits due to material failure in components such as gaskets and piping.

The Kammprofile gasket design is an alternate flange isolation gasket design that can be used in high temperature applications. The retainer has serrations on the two surfaces that interface with the flange faces. A dielectric thin film, such as flexible graphite, EPTFE, or HTG rests against the retainer's serrations and the flange faces. The dielectric thin film compresses as bolt load is applied to the flange faces, acting as a sealing element. This gasket design reaches safe operating limits as defined by ANSI B16.5 class 2500. Examples of this Kammprofile gasket design include Flexitallic® I-Flex, and Klinger® Maxiprofile. FIG. 2 shows prior art of the invention, namely a cross section of a Kammprofile flange isolation kit joining two flanges. A Kammprofile flange isolation gasket is placed between two flange faces. FIG. 2a is an enlarged view of the Kammprofile flange isolation gasket depicted in FIG. 2, showing the retainer's serrations on the two surfaces that seal against the flange faces. A dielectric thin film rests against the retainer's serrations and the flange faces.

There are a number of weaknesses in flange isolation gaskets made from a Kammprofile gasket design. The presence of a metal core at the inner diameter of the retainer compromises electrical isolation between flange connectors. Electrical resistance is directly proportional to the thickness of the dielectric thin film, which creates an electrical isolation gap between the flange connectors and the retainer. The dielectric thin film is even thinner than 0.090", providing very limited electrical isolation; fluids flowing through the pipeline can easily bridge this gap, limiting the efficiency of an installed cathodic protection system. The metal core serrations are deep and a thin layer of dielectric material rests between the metal core serrations and the metal flange face. At higher bolt load, the compressive force increases the probability that the serrations will touch the flange face and conduct electricity. At operating pressures, the compressive force exerted on the thin dielectric layer weakens it. Such weakening leads the thin dielectric layer to be extruded from its original shape.

In summary, currently available high-pressure flange isolation gaskets have many design weaknesses: 1) the use of metal compromises dielectric properties, 2) the presence of multiple inboard sealing elements increases failure points and reduces flange life expectancy, and 3) the exposure of multiple materials to highly corrosive media requires numerous combinations to handle different applications. The material properties of glass reinforced epoxy (GRE) prevent applications over 400 degrees Fahrenheit. No currently available flange isolation gasket can reach operating temperatures of 500 degrees Fahrenheit in the highest available pressure classes ANSI B16.5 class 2500 and API 6A 20000 while providing the best isolation property found only in non-metallic isolation gaskets.

All currently available flange isolation retainers are made in a flat parallel configuration, where the faces of the retainers are parallel to each other. When bolts on a flange are tightened, they exert forces on the outer sections of the flange, creating a moment arm that bends the flanges. The flanges rotate so that the outer diameter (OD) section of the flanges are drawn closer together and the inner diameter section of the flanges are spread apart. This phenomenon is called flange rotation. This flange rotation causes flange faces to lift off the sealing elements, potentially beyond the minimum seal seating load, causing poor sealing or seal failure. Internal pressure within the vessel also causes a reaction force on the flange faces by the inner diameter. This also causes the flange rotation. As the flange faces lift off the sealing elements, internal pressure can extrude the sealing elements past the retainer and cause seal damage or premature seal failure. Having the faces of the retainer be parallel to each other does nothing to counteract flange rotation.

The bond strength in a three-layer composition structure may not be homogeneous throughout the retainer surface, providing a weak/failure point in high pressure/high temperature applications for currently available design flange isolation gaskets.

BRIEF SUMMARY OF THE INVENTION

A non-metallic flange isolation gasket kit is described. This non-metallic flange isolation gasket kit provides high pressure, high temperature, and high chemical compatibility with increased electrical isolation properties.

A first embodiment of the non-metallic flange isolation gasket kit comprises of a retainer (100), a seal (120), and a seal pre-load structural ring (140). The retainer (100) is precision machined from a reinforced resin material that provides high pressure, high temperature, and high chemical compatibility with increased electrical isolation properties. For example, the retainer may be precision machined from washer-shaped slices of cured filament wound material (91) or cured convolute wrapped pre-preg material (92). The seal pre-load structural ring (140) is inserted into the seal (120), and the seal outer diameter surface (122) is joined to the retainer inner diameter surface (116). Flange rotation is decreased by having the upper and lower surfaces of the retainer (100) be tapered.

A second embodiment of the non-metallic flange isolation gasket kit comprises of a composite gasket blank (160) and a seal pre-load structural ring (140). The composite gasket blank (160) comprises of a retainer (100) and a seal (120). The composite gasket blank (160) is made through a composite winding/wrapping process, where tube shape compression molded fluoropolymer (350) is over molded with one or more layers of impregnated composite fiber filaments (303) and one or more layers of semi-cured impregnated composite fabric matrix (326). This material is then cured and cut. The seal (120) is machined from the tube shape compression molded fluoropolymer (350) section of the composite gasket blank (160). The retainer (100) is machined from the cured filament wound material (91) and cured convolute wrapped pre-preg material (92) section of the composite gasket blank (160). The seal (120) and the retainer (100) are joined by thermal fusion bonding. The seal outer diameter surface (122) and the retainer inner diameter surface (116) are joined by thermal fusion bonding.

The non-metallic flange isolation gasket kit may further comprise one or more gasket seating stress stabilizers (180). The non-metallic flange isolation gasket kit may further comprise a centering ring (150).

BRIEF DESCRIPTION OF THE SEVERAL VIEWS OF THE DRAWING

FIG. 33 shows a top view of the gasket seating stress bushing (182) that is circular in shape. The gasket seating stress bushing (182) has a gasket seating stress stabilizer hole (181).

FIG. 33*a* shows a sectional view of the top view of the gasket seating stress bushing (182) that is circular in shape of FIG. 33 taken at the sectioning plane and in the direction indicated by section lines 33*a*-33*a*.

FIG. 34 shows a top view of the segment-less gasket seating stress bushing (188).

FIG. 34*a* shows a sectional view of the top view of the segment-less gasket seating stress bushing (188) of FIG. 34 taken at the sectioning plane and in the direction indicated by section lines 34*a*-34*a*.

(I) DETAILED DESCRIPTION OF THE INVENTION

Figure 1:
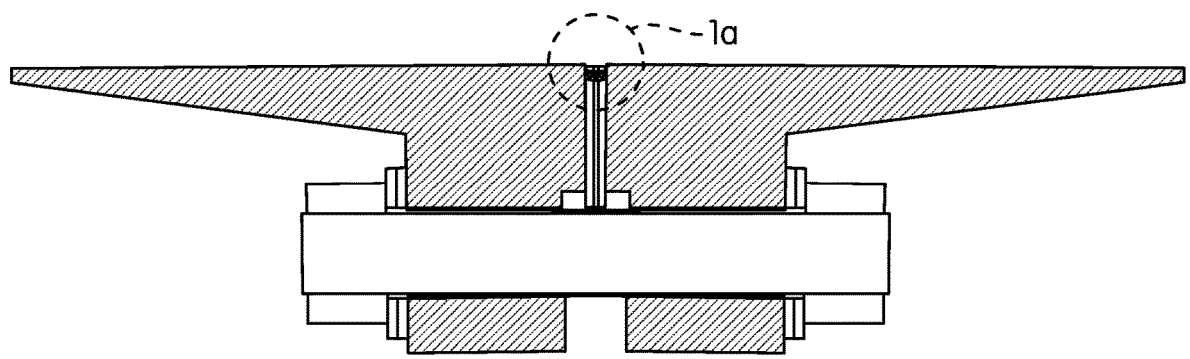
FIG. 1 shows prior art of the invention, namely a cross section of a flange isolation kit joining two flanges. A flange isolation gasket is placed between two flange faces. The retainer is created from a three-layer composition structure. A circular concentric groove is present on both the upper and lower face of the retainer. Sealing elements are inserted in each of the grooves of the retainer.
Figure 1A:
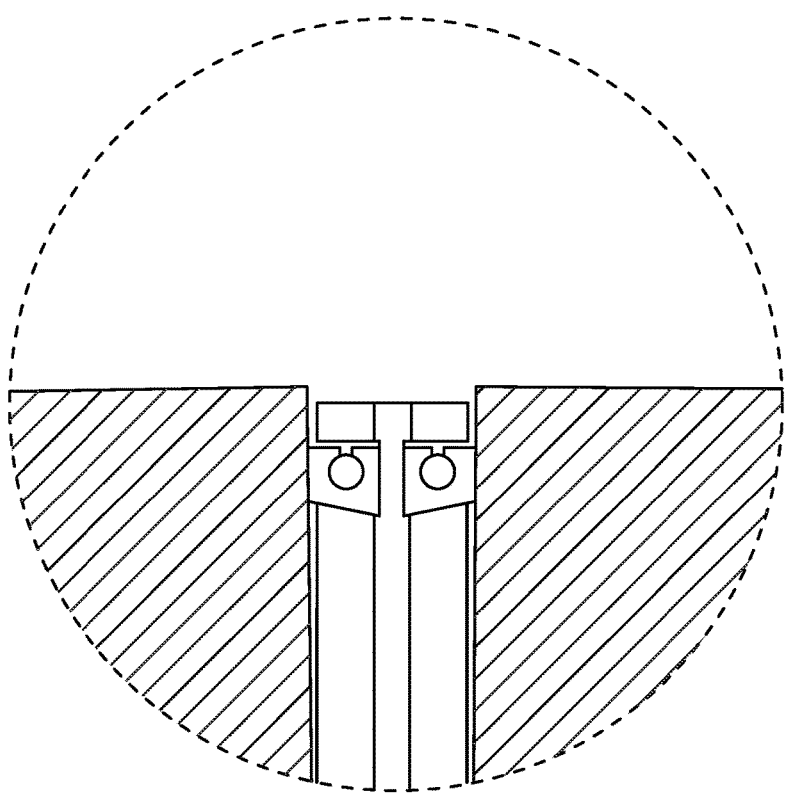
FIG. 1a is an enlarged cross section view of the flange isolation gasket depicted in FIG. 1.
Figure 2:
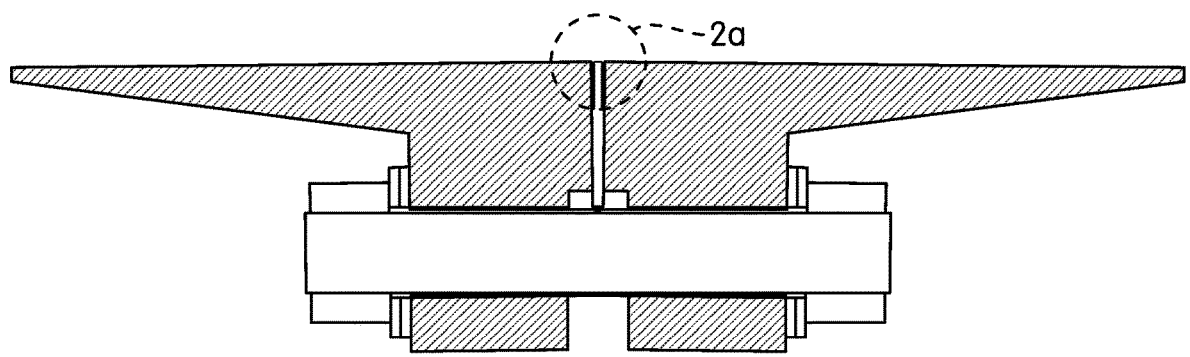
FIG. 2 shows prior art of the invention, namely a cross section of a Kammprofile flange isolation kit joining two flanges. A Kammprofile flange isolation gasket is placed between two flange faces.
Figure 2A:
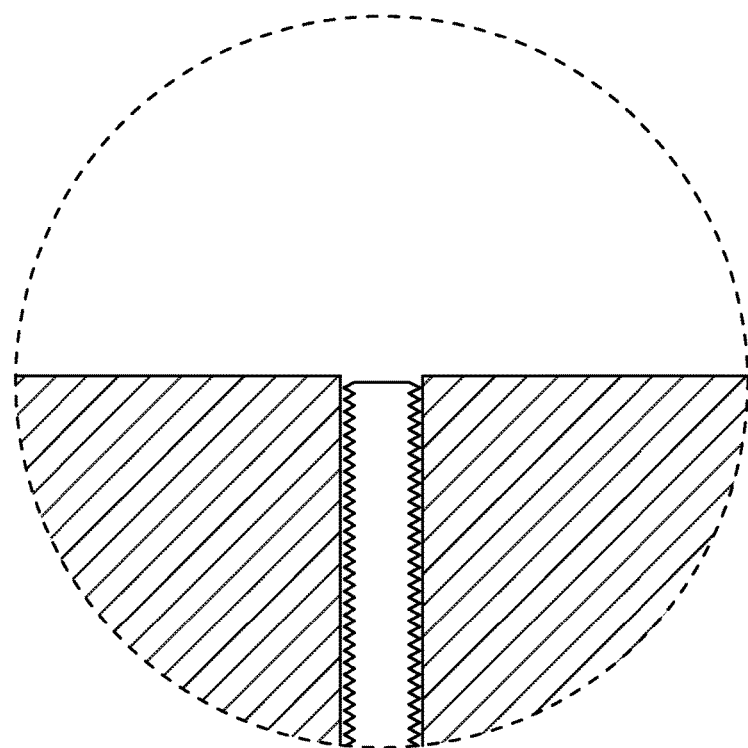
FIG. 2a is an enlarged view of the flange isolation gasket depicted in FIG. 2, showing the retainer's serrations on the two surfaces that interface with the flange faces. A dielectric thin film rests against the retainer's serrations and the flange faces.

A non-metallic flange isolation gasket kit is described. This non-metallic flange isolation gasket kit provides high pressure, high temperature, and high chemical compatibility with increased electrical isolation properties.

A first embodiment of the non-metallic flange isolation gasket kit comprises of a retainer (100), a seal (120), and a seal pre-load structural ring (140). The retainer (100) is precision machined from a reinforced resin material that provides high pressure, high temperature, and high chemical compatibility with increased electrical isolation properties. For example, the retainer may be precision machined from washer-shaped slices of cured filament wound material (91) or cured convolute wrapped pre-preg material (92). The seal pre-load structural ring (140) is inserted into the seal (120), and the seal outer diameter surface (122) is joined to the retainer inner diameter surface (116). Flange rotation is decreased by having the upper and lower surfaces of the retainer (100) be tapered.

A second embodiment of the non-metallic flange isolation gasket kit comprises of a composite gasket blank (160) and a seal pre-load structural ring (140). The composite gasket blank (160) comprises of a retainer (100) and a seal (120). The composite gasket blank (160) is made through a composite winding/wrapping process, where tube shape compression molded fluoropolymer (350) is over molded with one or more layers of impregnated composite fiber filaments (303) and one or more layers of semi-cured impregnated composite fabric matrix (326). This material is then cured and cut. The seal (120) is machined from the tube shape compression molded fluoropolymer (350) section of the composite gasket blank (160). The retainer (100) is machined from the cured filament wound material (91) and cured convolute wrapped pre-preg material (92) section of the composite gasket blank (160). The seal outer diameter surface (122) and the retainer inner diameter surface (116) are joined by thermal fusion bonding.

The non-metallic flange isolation gasket kit may further comprise one or more gasket seating stress stabilizers (180). The non-metallic flange isolation gasket kit may further comprise a centering ring (150).

Figure 4A:
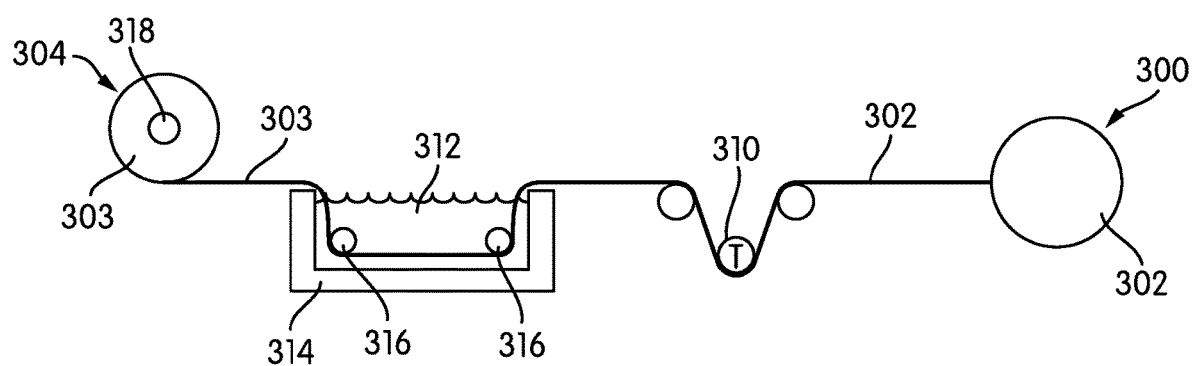
FIG. 4a shows the processing of composite fiber filaments (302) from a spool of composite fiber filaments (300) into impregnated composite fiber filaments (303) wound into a roll of impregnated composite fiber filaments (304).

(1) Filament Winding and Pre-Preg Wrapping Processes for Making Retainer Material The material used to create the retainer (100) can be made from various processes; three processes are presented. The first process is called filament winding. The process involves winding composite fiber filaments (302) with high strength, such as e-glass, s-glass, fiberglass, carbon, or basalt, onto a rotating mandrel (318). Composite fiber filaments (302), typically but not necessarily, supplied from a spool of composite fiber filaments (300) are brought under tension by a tensioner (310). The composite fiber filaments (302), while under tension, are guided through a resin bath (314) by a series of guide bars (316). The composite fiber filaments (302) are impregnated with a resin (312). The preferred resin systems for this process are thermoset resins such as epoxy, phenolic, melamine or silicone. The impregnated composite fiber filaments (303) are then wound onto a rotating mandrel (318), creating a roll of impregnated composite fiber filaments (304). FIG. 4a shows the processing of composite fiber filaments (302) from a spool of composite fiber filaments (300) into impregnated composite fiber filaments (303) wound into a roll of impregnated composite fiber filaments (304). Once the roll of impregnated composite fiber filaments (304) reaches the desired outer diameter, the roll of impregnated composite fiber filaments (304) is removed from the winding equipment. The roll of impregnated composite fiber filaments (304) is then either cured at room temperature or at elevated temperatures in an oven (319). The curing process cures the impregnated composite fiber filaments (303) into cured filament wound material (91).

The curing process is the toughening or hardening of a polymer material by cross-linking of polymer chains, brought about by electron beams, heat or chemical additives. The curing process can be modified as a function of cure temperature, where the polymer material can be cured with snap, fast, high or low temperatures. The cure temperature profile over time can be constant, ramped/stepped, or staged. The three processes described here avail themselves to any and all of the curing processes known by a person with ordinary skill in the art.

In a single step cure process, the initial cure temperature for curing is the same throughout the process and is the final cure temperature. The material is generally cured at ambient temperature or at higher than ambient temperature that is predetermined and does not change during the cure cycle. As an example, EZ-Lam High Temperature Epoxy Resin is a two part, high temperature curing laminating system specially formulated for construction of high strength, high temperature composite parts. Its low viscosity offers excellent wet out characteristics and it is bondable to all fabrics including, fiberglass, carbon fiber, aramid (Kevlar®), core materials, wood and metal. When combined, the mixture provides a pot life of four hours at 75° F. The resin must undergo room temperature set for 24-48 hours at 75° F., followed by a tiered post cure cycle, starting at 150° F. and ending at 350° F. Allow the part to cool in the oven prior to removal. The maximum operating temperature is 450° F. Post curing or multi-step post curing, also known as a tiered post cure cycle, are a common secondary curing process used to increase and complete polymerization, which can increase the physical properties and operating temperature of a composite. Post-cure schedules vary depending on the resin or a resin/hardener combination, the desired composite physical properties, and the capability of the post-cure equipment to reach and maintain a target temperature. Generally, components are post-cured in the mold in which they were bonded but are not limited to being post cured in the mould.

Multi-step or tiered curing schedules vary depending on the resin or a resin/hardener combination, the desired composite physical properties, and the capability of the post-cure equipment to reach and maintain a target temperature. A resin is infused at an ambient temperature or at an elevated temperature higher than the ambient temperature and held at that temperature for a predetermined amount of time. Over time, temperature is incrementally increased to a predetermined temperature and the temperature is held for a predetermined amount of time. Multiple increments may be necessary to ensure the required polymerization has occurred. A multi-step or tiered curing schedule can include decreasing the temperature incrementally. Over time, temperature is incrementally decreased to a predetermined temperature and the temperature is held for a predetermined amount of time. Multiple decrements may be necessary to ensure the required polymerization has occurred. Multi-step or tiered curing schedules can utilize both incremental increases in temperature and incremental decreases in temperature over time. Multi-step or tiered curing schedules can also utilize a post curing or multi step post curing cycle, also known as a tiered post cure cycle. These multi step or tiered curing schedules are a common secondary curing process used to increase and complete polymerization, which can increase the physical properties and operating temperature of a composite. Post-cure schedules vary depending on the resin or a resin/hardener combination, the desired composite physical properties, and the capability of the post-cure equipment to reach and maintain a target temperature. Generally, components are post-cured in the mould in which they were bonded but are not limited to being post cured in the mould.

Figure 3A:
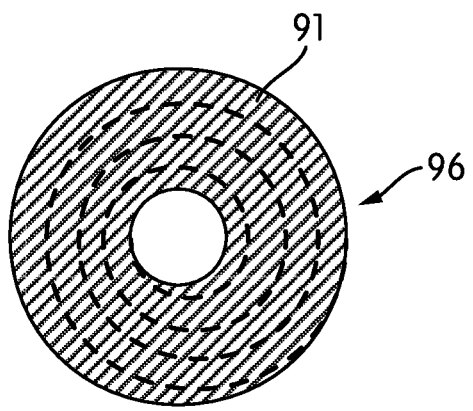
FIG. 3a shows a cross section of the roll of cured filament wound material (96), made from cured filament wound material (91).
Figure 4B:
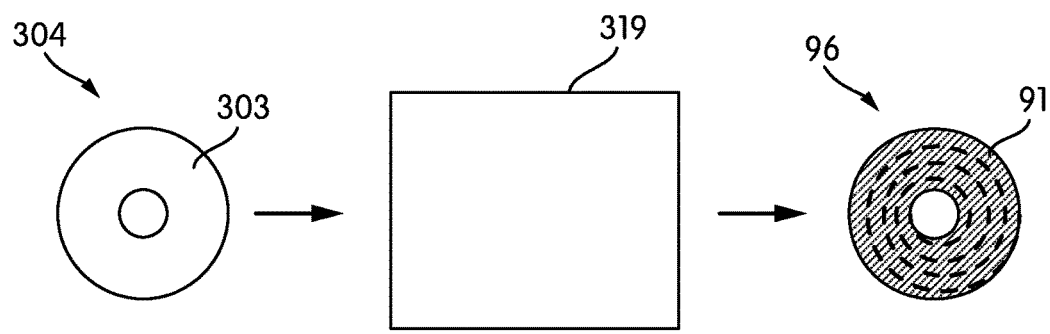
FIG. 4b shows the processing of impregnated composite fiber filaments (303) from a roll of impregnated composite fiber filaments (304) into cured filament wound material (91) wound into a roll of cured filament wound material (96).

FIG. 4b shows the processing of impregnated composite fiber filaments (303) from a roll of impregnated composite fiber filaments (304) into cured filament wound material (91) wound into a roll of cured filament wound material (96). FIG. 3a shows a cross section of the roll of cured filament wound material (96) made from cured filament wound material (91). The roll of cured filament wound material (96) made from cured filament wound material (91) can then be cut into washer-shaped slices.

Figure 5A:
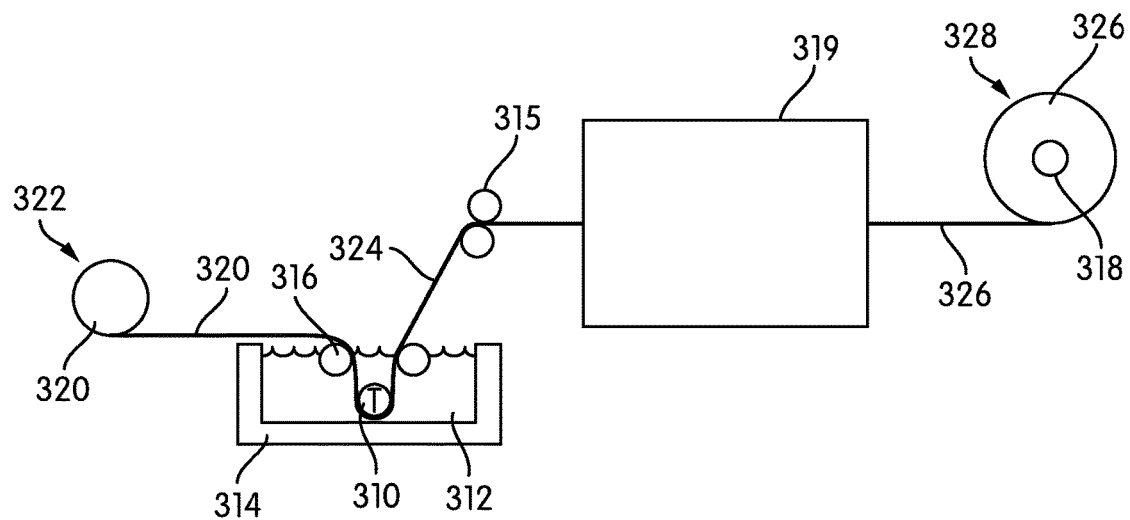
FIG. 5a shows the processing of composite fabric matrix (320) from a roll of composite fabric matrix (322) into semi-cured impregnated composite fabric matrix (326) wound into a roll of semi-cured impregnated composite fabric matrix (328).

The second process is called pre-preg wrapping. Pre-preg is a term for "pre-impregnated" composite fibers or fabric woven into a matrix, where thermoset resins such as epoxy, phenolic, melamine and silicone are already present. Composite fabric matrix (320) from a roll of composite fabric matrix (322) is brought under tension by a tensioner (310). The composite fabric matrix (320), while under tension, is guided through a resin bath (314) by a series of guide bars (316). The composite fiber matrix (320) is impregnated with a resin (312) and processed through squeeze rollers (315). This impregnated composite fiber matrix (324) is then semi-cured through an oven (319), the semi-curing process. The resulting material from this semi-curing process is called semi-cured impregnated composite fabric matrix (326). The semi-cured impregnated composite fabric matrix (326) is wound through a rotating mandrel (318) creating a roll of semi-cured impregnated composite fabric matrix (328). The impregnated composite fiber matrix (324) is semi-cured to allow for easier handling. FIG. 5a shows the processing of composite fabric matrix (320) from a roll of composite fabric matrix (322) into semi-cured impregnated composite fabric matrix (326) wound into a roll of semi-cured impregnated composite fabric matrix (328).

The roll of semi-cured impregnated composite fabric matrix (328) maybe be cut into custom lengths and widths. Semi-cured impregnated composite fabric matrix (326) from the roll of semi-cured impregnated composite fabric matrix (328) is then wrapped under tension around a rotating mandrel (318), creating a tensioned roll of semi-cured impregnated composite fabric matrix (330).

Once the tensioned roll of semi-cured impregnated composite fabric matrix (330) reaches a desired outer diameter, the tensioned roll of semi-cured impregnated composite fabric matrix (330) are removed from the processing equipment. The tensioned roll of semi-cured impregnated composite fabric matrix (330) is placed in an oven (319) and the semi-cured impregnated composite fabric matrix (326) is either cured at room temperature or at elevated temperatures in an oven (319). The curing process cures the semi-cured impregnated composite fabric matrix (326) into cured convolute wrapped pre-preg material (92). The tensioned roll of semi-cured impregnated composite fabric matrix (330) is cured into a roll of cured convolute wrapped pre-preg material (97).

Figure 3B:
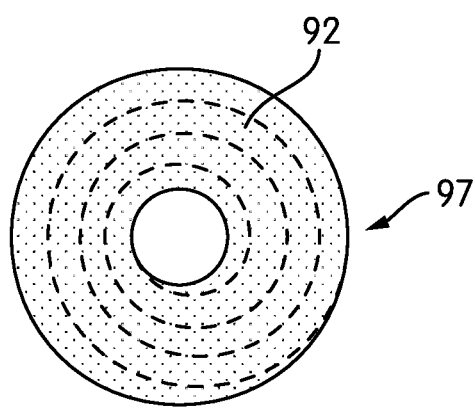
FIG. 3b shows a cross section of the roll of cured convolute wrapped pre-preg material (97) made from cured convolute wrapped pre-preg material (92).
Figure 5B:
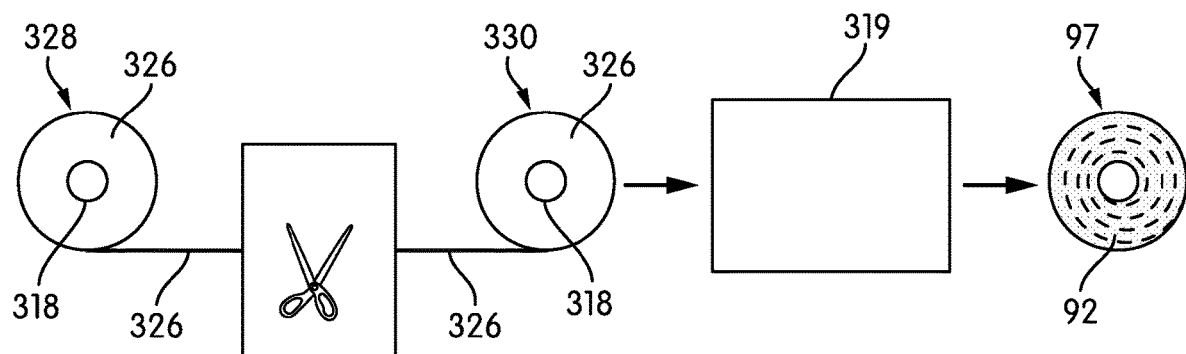
FIG. 5b shows the processing of semi-cured impregnated composite fabric matrix (326) from a roll of semi-cured impregnated composite fabric matrix (328) into cured convolute wrapped pre-preg material (92) wound into a roll of cured convolute wrapped pre-preg material (97).

FIG. 5b shows the processing of semi-cured impregnated composite fabric matrix (326) from a roll of semi-cured impregnated composite fabric matrix (328) into cured convolute wrapped pre-preg material (92) wound into a roll of cured convolute wrapped pre-preg material (97). FIG. 3b shows a cross section of the roll of cured convolute wrapped pre-preg material (97) made from cured convolute wrapped pre-preg material (92). The roll of cured convolute wrapped pre-preg material (97) can then be cut into washer-shaped slices.

These washer-shaped slices created from either the filament winding process or the pre-preg wrapping process can then be machined into the retainer (100). The material properties of the cured filament wound material (91) or the cured convolute wrapped pre-preg material (92) allow for precise cuts with low manufacturing process variation, usually within +/−0.005". These precise cuts allow for the retainer (100) to provide effective sealing properties. The retainer (100) is machined to a three-dimensional shape resembling a washer.

Currently available retainers are typically manufactured from a sheet form. For instance, a metal core retainer is manufactured from multiple layers of material that are bonded together. Each layer has a manufacturing process variation at a minimum of +/−0.010. Hence the stack up manufacturing process variation of the finished metal core retainer would be at best +/−0.020".

The third process for making retainers (100) is called composite winding/wrapping. Tube shape compression molded fluoropolymer (350) is utilized as the base material in this process. The outer diameter surface of the tube shape compression molded fluoropolymer (352) is normally flat but other surface contours may be utilized. The outer diameter surface of the tube shape compression molded fluoropolymer (352) is chemically etched. This chemical etching is performed utilizing fluoropolymer pre-bonding etchants such as FluoroEtch (manufactured by Acton Technologies), allowing the outer diameter surface of the tube shape compression molded fluoropolymer (352) to bond to other materials, specifically the impregnated composite fiber filaments (303) and the semi-cured impregnated composite fabric matrix (326). Fluoropolymer pre-bonding etchants that allow for such type of bonding typically contain the active ingredient Sodium Naphthalene. Other ingredients known in the industry that have this bonding property may be substituted for Sodium Naphthalene. The chemical etching increases the number of pores exposed at the outer diameter surface of the tube shape compression molded fluoropolymer (352)

Once the tube shape compression molded fluoropolymer (350) is chemically etched, the tube shape compression molded fluoropolymer (350) is inserted over a mandrel (318) and over-molded with impregnated composite fiber filaments (303) and/or semi-cured impregnated composite fabric matrix (326). Over-molding is the process of adding layers of material over an already existing piece or part. By combining the filament winding process and the pre-preg wrapping process, alternating layers of impregnated composite fiber filaments (303) and semi-cured impregnated composite fabric matrix (326) can be added to the tube shape compression molded fluoropolymer (350). The first layer can be either the impregnated composite fiber filaments (303) or the semi-cured impregnated composite fabric matrix (326). There is at least one layer of the impregnated composite fiber filaments (303) and at least one layer of the semi-cured impregnated composite fabric matrix (326). Varying combinations of layers and thickness of layers can be achieved to obtain the needed radial and axial strengths until the desired outer diameter is obtained. For instance, the thickness of a layer of impregnated composite fiber filaments (303) may be adjusted by the number of impregnated composite fiber filaments windings per layer. The thickness of a layer of semi-cured impregnated composite fabric matrix (326) may be adjusted by the number of semi-cured impregnated composite fabric matrix windings per layer.

Figure 6A:
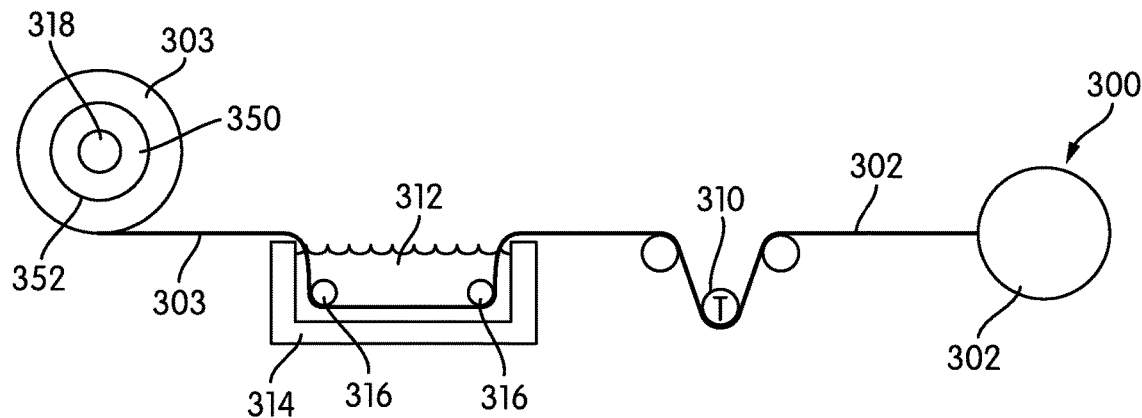
FIG. 6a shows the process of adding a layer of impregnated composite fiber filaments (303) over the tube shape compression molded fluoropolymer (350).

To add a layer of impregnated composite fiber filaments (303), composite fiber filaments (302), typically but not necessarily, supplied from a spool of composite fiber filaments (300) are brought under tension by a tensioner (310). The composite fiber filaments (302), while under tension, are guided through a resin bath (314) by a series of guide bars (316). The composite fiber filaments (302) are impregnated with a resin (312). The preferred resin systems for this process are thermoset resins such as epoxy, phenolic, melamine or silicone. The impregnated composite fiber filaments (303) are then wound over either the tube shape compression molded fluoropolymer (350) or an existing layer of semi-cured impregnated composite fabric matrix (326), creating a layer of impregnated composite fiber filaments (303). FIG. 6a shows the process of adding a layer of impregnated composite fiber filaments (303) over the tube shape compression molded fluoropolymer (350).

Figure 6B:
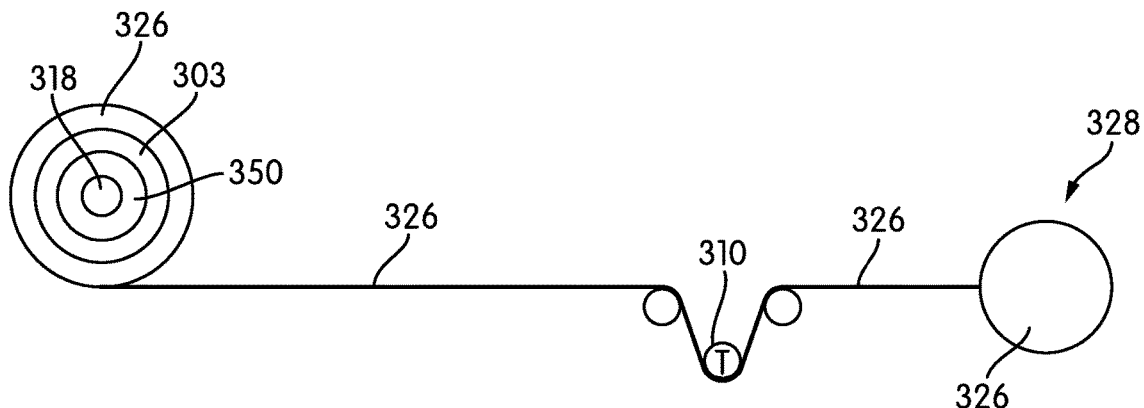
FIG. 6b shows the process of adding a layer of semi-cured impregnated composite fabric matrix (326) over the layer of impregnated composite fiber filaments (303) and the tube shape compression molded fluoropolymer (350).

To add a layer of semi-cured impregnated composite fabric matrix (326), semi cured impregnated composite fabric matrix (326) from the roll of semi-cured impregnated composite fabric matrix (328) is brought under tension by a tensioner (310). The cured impregnated composite fabric matrix (326) is then wound over the tube shape compression molded fluoropolymer (350) or an existing layer of impregnated composite fiber filaments (303), creating a layer of semi cured impregnated composite fabric matrix (326). FIG. 6b shows the process of adding a layer of semi-cured impregnated composite fabric matrix (326) over the layer of impregnated composite fiber filaments (303) and the tube shape compression molded fluoropolymer (350).

Figure 6C:
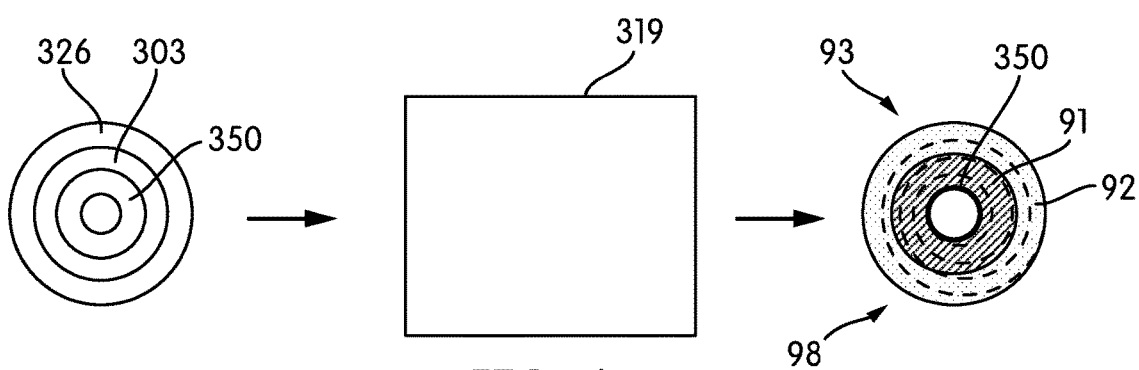
FIG. 6c shows the process of curing the semi-cured impregnated composite fabric matrix (326) into cured convolute wrapped pre-preg material (92) and curing the impregnated composite fiber filaments (303) into cured filament wound material (91) in an oven (319).

Once the tube shape compression molded fluoropolymer (350) has been over-molded with one or more layers of the impregnated composite fiber filaments (303) and one or more layers of the semi-cured impregnated composite fabric matrix (326) and reaches a desired outer diameter, it is removed from the processing equipment. The roll of tube shape compression molded fluoropolymer (350) over-molded with one or more layers of the impregnated composite fiber filaments (303) and one or more layers of the semi-cured impregnated composite is called the over-molded material. The over-molded material is cured at elevated temperatures in an oven (319). The curing process cures the semi-cured impregnated composite fabric matrix (326) into cured convolute wrapped pre-preg material (92). The curing process cures the impregnated composite fiber filaments (303) into cured filament wound material (91). FIG. 6c shows the process of curing the semi-cured impregnated composite fabric matrix (326) into cured convolute wrapped pre-preg material (92) and curing the impregnated composite fiber filaments (303) into cured filament wound material (91) in an oven (319).

During this curing process, the bond between the tube shape compression molded fluoropolymer (350) and the first layer, either the impregnated composite fiber filaments (303) or the semi-cured impregnated composite fabric matrix (326), may be further strengthened by a modified curing process. This modified curing process allows thermal fusion bonding between the tube shape compression molded fluoropolymer (350) and the first layer, either the impregnated composite fiber filaments (303) or the semi-cured impregnated composite fabric matrix (326). Thermal fusion bonding fuses the tube shape compression molded fluoropolymer (350) and the first layer together via a thermal cycle.

The thermal cycle process consists of ramping the oven temperature to a pre-flow temperature and waiting for the over-molded material inside the oven to reach the pre-flow temperature. At the pre-flow temperature, the fluoropolymer expands, creating outward pressures and opening pores within its material structure. This creates a material state that optimizes the flow of gelled resin into the pores of the fluoropolymer.

Once the temperature of over-molded material is uniform, the oven temperature is ramped to the thermal fusion bonding temperature and held at the thermal fusion bonding temperature. The thermal fusion bonding temperature for performing this thermal fusion bonding is normally lower than the glass transient temperature (Tg) of the over-molded material.

At the thermal fusion bonding temperature, the resin in the first layer reaches a gel state and diffuses across the interface between the tube shape compression molded fluoropolymer (350) and the first layer. This interface diffusion creates crosslinks between the tube shape compression molded fluoropolymer (350) and the gelled resin from the first layer. Once sufficient material diffusion and crosslinking occurs across the interface between the tube shape compression molded fluoropolymer (350) and the first layer, the oven temperature is then slowly ramped down at a steady rate.

When the gelled resin in the first layer diffuses and crosslinks, it is important that the tube shape compression molded fluoropolymer (350) is at the material state that optimizes the flow of gelled resin into the pores of the fluoropolymer, where: a) increased number of pores and pore size allows for enhanced diffusion of gelled resin across the interface into the pores and b) the expansion of the fluoropolymer creates compression forces upon the first layer that enhances the diffusion of gelled resin across the interface into the pores. By placing the tube shape compression molded fluoropolymer (350) at a certain pre-flow temperature, it ensures that the fluoropolymer be at the material state that optimizes the flow of gelled resin into the pores of the fluoropolymer once the gelled resin diffuses across the interface ("diffusion synchronization"). If no allowance is made to place the fluoropolymer at the pre-flow temperature (e.g. too low of a temperature), the fluoropolymer is not ready to optimally receive the gelled resin.

The chemical etching performed to the tube shape compression molded fluoropolymer outer diameter surface (352) increases the availability of pores with material characteristics (e.g. size and shape) that enhance diffusion and cross-linking across the interface between the tube shape compression molded fluoropolymer (350) and the first layer.

The material produced by this modified curing process, comprising of the tube shape compression molded fluoropolymer (350), the cured filament wound material (91), and the cured convolute wrapped pre-preg material (92) is referred as the cured composite material (93). The curing process cures the roll of tube shape compression molded fluoropolymer (350) over-molded with one or more layers of the impregnated composite fiber filaments (303) and one or more layers of the semi-cured impregnated composite fabric matrix (326) into a roll of cured composite material (98).

Figure 3C:
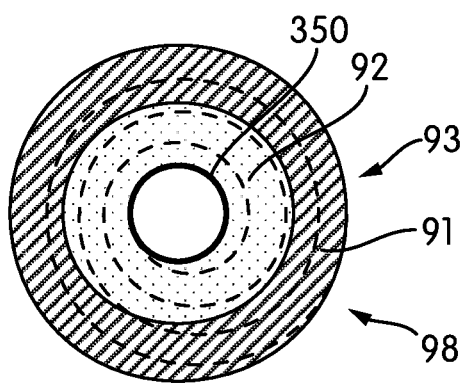
FIG. 3c shows a cross section of a roll of cured composite material (98) made from the cured composite material (93). The tube shape compression molded fluoropolymer (350) is over-molded with a first layer of cured convolute wrapped pre-preg material (92) and a second layer of cured filament wound material (91). There are a plurality of windings forming the first layer of cured convolute wrapped pre-preg material (92); there are a plurality of windings forming second layer of cured filament wound material (91).
Figure 3D:
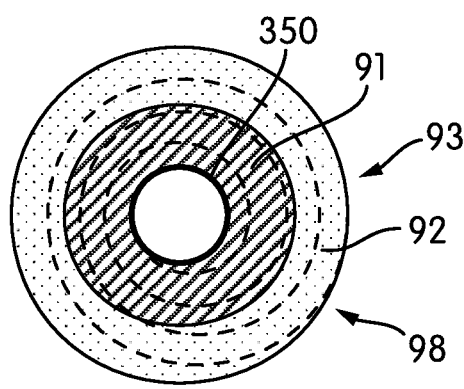
FIG. 3d shows a cross section of a roll of cured composite material (98) made from the cured composite material (93). The tube shape compression molded fluoropolymer (350) is over-molded with a first layer of cured filament wound material (91) and a second layer of cured convolute wrapped pre-preg material (92). There are a plurality of windings forming the second layer of cured convolute wrapped pre-preg material (92); there are a plurality of windings forming first layer of cured filament wound material (91).
Figure 3E:
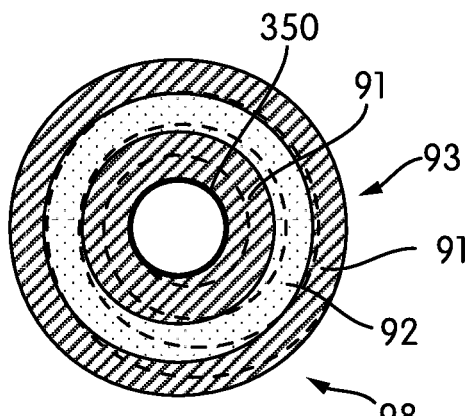
FIG. 3e shows a cross section of a roll of cured composite material (98) made from the cured composite material (93). The tube shape compression molded fluoropolymer (350) is over-molded with a first layer of cured filament wound material (91), a second layer of cured convolute wrapped pre-preg material (92), and a third layer of cured filament wound material (91).
Figure 3F:
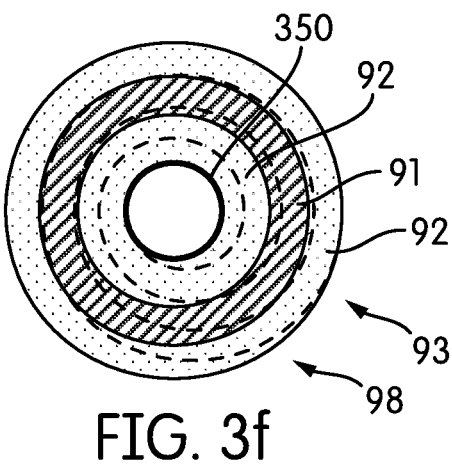
FIG. 3f shows a cross section of a roll of cured composite material (98) made from the cured composite material (93). The tube shape compression molded fluoropolymer (350) is over-molded with a first layer of cured convolute wrapped pre-preg material (92), a second layer of cured filament wound material (91) and a third layer of cured convolute wrapped pre-preg material (92).

FIG. 3c shows a cross section of a roll of cured composite material (98) made from the cured composite material (93). The tube shape compression molded fluoropolymer (350) is over-molded with a first layer of cured convolute wrapped pre-preg material (92) and a second layer of cured filament wound material (91). There are a plurality of windings forming the first layer of cured convolute wrapped pre-preg material (92); there are a plurality of windings forming second layer of cured filament wound material (91). FIG. 3d shows a cross section of a roll of cured composite material (98) made from the cured composite material (93). The tube shape compression molded fluoropolymer (350) is over-molded with a first layer of cured filament wound material (91) and a second layer of cured convolute wrapped pre-preg material (92). There are a plurality of windings forming the second layer of cured convolute wrapped pre-preg material (92); there are a plurality of windings forming first layer of cured filament wound material (91). FIG. 3e shows a cross section of a roll of cured composite material (98) made from the cured composite material (93). The tube shape compression molded fluoropolymer (350) is over-molded with a first layer of cured filament wound material (91), a second layer of cured convolute wrapped pre-preg material (92), and a third layer of cured filament wound material (91). FIG. 3f shows a cross section of a roll of cured composite material (98) made from the cured composite material (93). The tube shape compression molded fluoropolymer (350) is over-molded with a first layer of cured convolute wrapped pre-preg material (92), a second layer of cured filament wound material (91) and a third layer of cured convolute wrapped pre-preg material (92).

The roll of cured composite material (98) made from the cured composite material (93) is then cut into washer-shaped slices. Composite gasket blanks (160) can then be machined from these washer-shaped slices. The material properties of the cured composite material (93) allow for precise cuts from the cured composite material (93) with low manufacturing process variation, usually within +/−0.005". These precise cuts allow for the composite gasket blank (160) to provide effective sealing properties.

The cured filament wound material (91) and the cured convolute wrapped pre-preg material (92) section of the cured composite material (93) are precision machined to create the retainer (100), which controls seal seating and optimizes seal support. The compression molded fluoropolymer section of the cured composite material (93) is precision machined to create the seal, an elastomeric energized high-pressure sealing element. The retainer (100) and the seal (120) made through the composite/winding process are collectively referred as the composite gasket blank (160).

The material produced by any of the first, second or third process is called processed material (90).

These processes allow for the control of both the circumferential and the axial strength of the cured filament wound material (91), the cured convolute wrapped pre-preg material (92), and the cured composite material (93), enabling the cured filament wound material (91), the cured convolute wrapped pre-preg material (92), and the cured composite material (93) to have high strength non-metallic properties that can be made into the retainer (100).

The structural circumferential strength of the retainer (100) made from any of the three above mentioned processes far exceeds that of a steel-clad retainer. A steel-clad retainer is comprised of a metal core, layers of glass mesh reinforcement, and a resin system binding together the metal core and the glass mesh reinforced layers. There are three main limitations to this design. First, the structural circumferential strength of the steel-clad retainer is limited by the shear strength of the bond between the metal core and the glass mesh reinforced layers. Second, the shear strength of the bond decreases as additional glass mesh reinforcement layers are added to the retainer. The strength of the glass mesh reinforced layers is limited to the glass transition properties of the resin. Third, the strength of the glass mesh reinforcement layers is highest along the orientation of the fiber direction, most commonly along the 0 and 90 degrees along the glass fabric plane. The use of the processed material (90) eliminates these three retainer design limitations. Metal is eliminated because the processed material (90) has glass fibers that are oriented in a continuous circumferential direction that provides the necessary strength to support the seal (120). First, the processed material eliminates the need to create interlamination. Second, because there are no layers, sheer force issues are mitigated. Third, because the filament is wound in a circumferential manner, the processed material provides 360 degrees of uniform strength. Furthermore, the non-metallic properties of the retainer (100) increase dielectric performance and corrosion resistance when compared to a steel-clad retainer.

(2) Discrete Retainer and Seal

A first embodiment of the non-metallic flange isolation gasket kit comprises of a retainer (100), a seal (120), and a seal pre-load structural ring (140). The retainer (100) is precision machined from a reinforced resin material that provides high pressure, high temperature, and high chemical compatibility with increased electrical isolation properties. For example, the retainer may be precision machined from washer-shaped slices of cured filament wound material (91) or cured convolute wrapped pre-preg material (92). The seal pre-load structural ring (140) is inserted into the seal (120), and seal outer diameter surface (122) is joined to the retainer inner diameter surface (116). Flange rotation is decreased by having the upper and lower faces of the retainer be tapered.

Figure 7:
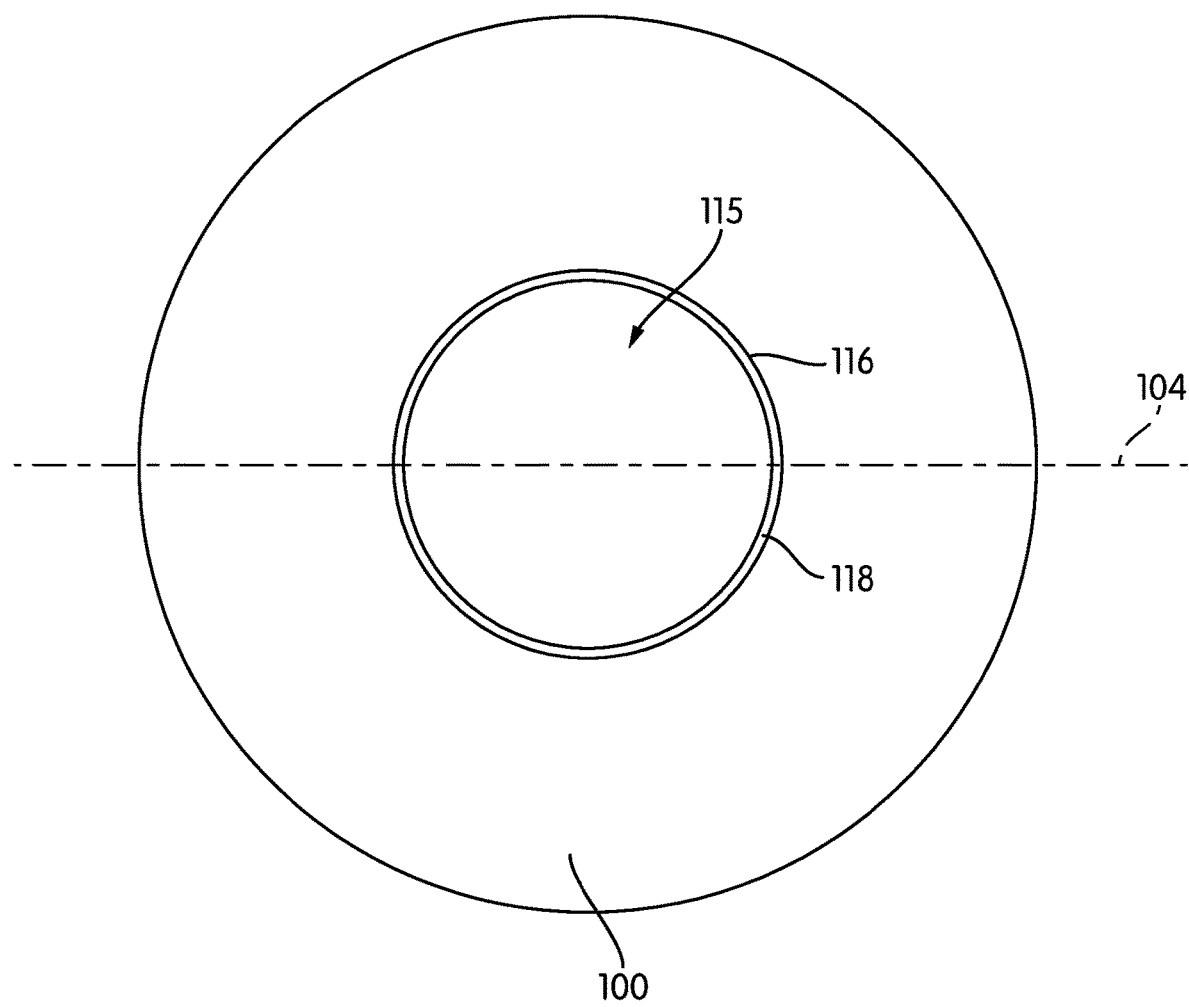
FIG. 7 is a top view of a retainer (100), where a retainer inner diameter surface (116) comprises of a male retainer interlock end (118). The retainer radial axis (104) is shown for reference purposes. The central bore (115) has a circular shape.

The retainer (100) is substantially disc shaped, comprising of a tapered upper surface (110), a tapered lower surface (112), and a central bore (115). The central bore (115) preferably has a circular cross-section but non-circular cross-sections may also be utilized. The retainer (100) further comprises a retainer outer diameter surface (114) and a retainer inner diameter surface (116). FIG. 7 is a top view of the retainer (100), where the retainer inner diameter surface (116) comprises of a male retainer interlock end (118). The retainer radial axis (104) is shown for reference purposes. The central bore (115) has a circular shape.

Figures 8, 8A:
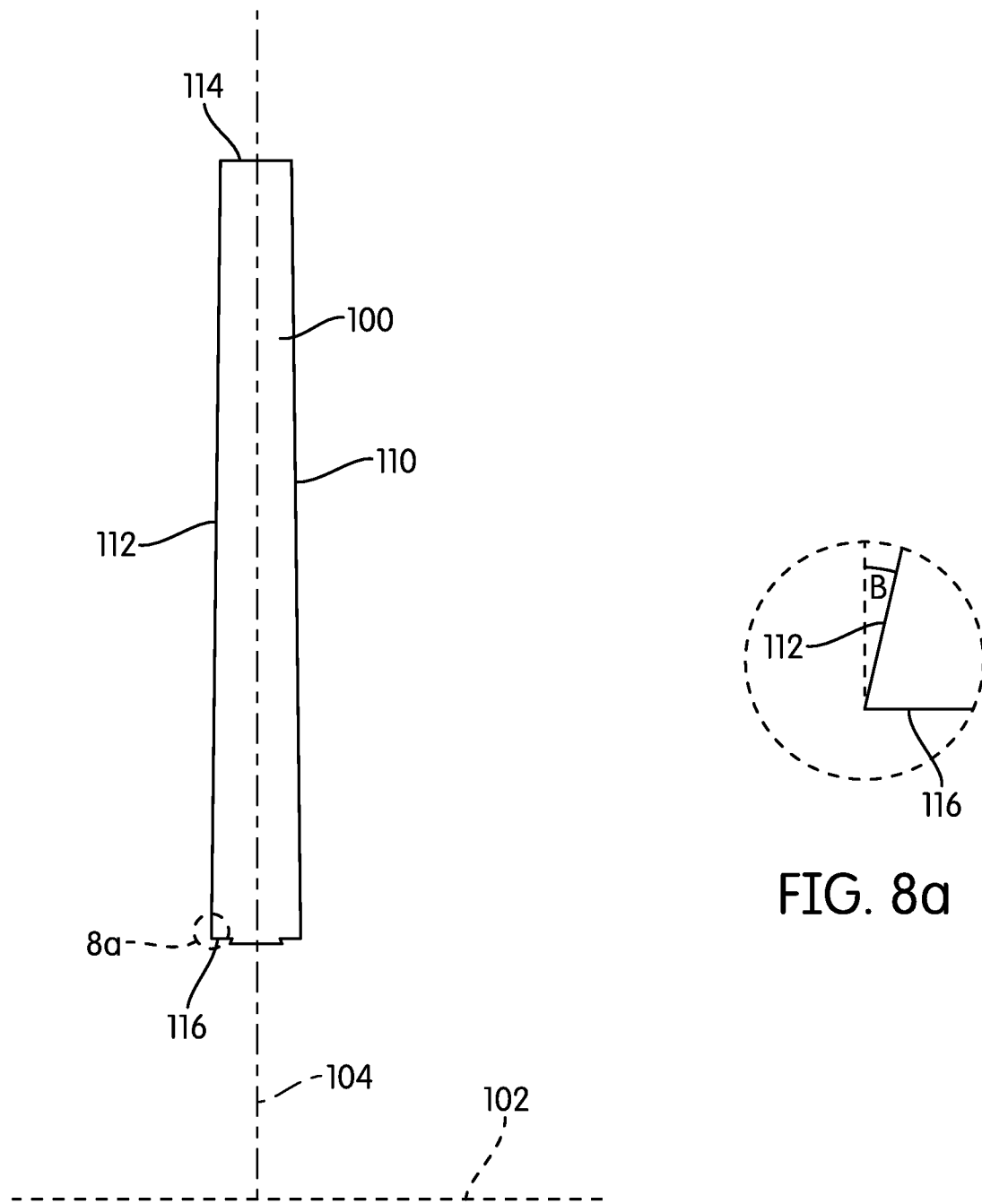
FIG. 8 is a cross section of one side of the retainer (100). The tapered upper surface (110) and the tapered lower surface (112) taper symmetrically along the retainer radial axis (104), where the retainer thickness (106) is at its largest at the retainer inner diameter surface (116) and at its smallest at the retainer outer diameter surface (114).
FIG. 8a is an enlarged view of the cross section of one side of the retainer (100) at the retainer inner diameter surface (116), showing the taper angle beta β of the tapered lower surface (112).

The retainer thickness (106) is defined as the distance between the tapered upper surface (110) and the tapered lower surface (112) perpendicular to the retainer central axis (102). The retainer thickness (106) tapers towards the retainer outer diameter surface (114). In other words, the retainer thickness (106) decreases from the retainer inner diameter surface (116) towards the retainer outer diameter surface (114). The tapering may be continuous or it may be partial, that is, there might be some segments of the retainer where there is no tapering. The tapering of the tapered upper surface (110) and the tapered lower surface (112) is preferably symmetrical along the retainer radial axis (104). FIG. 8 is a cross section of one side of the retainer (100). The tapered upper surface (110) and the tapered lower surface (112) taper symmetrically along the retainer radial axis (104), where the retainer thickness (106) is at its largest at the retainer inner diameter surface (116) and at its smallest at the retainer outer diameter surface (114).

These tapered characteristics of the retainer (100) help control flange rotation. When flanged connections are assembled with currently available retainers, flanges are tightened at the outer edges, creating a moment arm on the flange and a force that tends to separate the flanges at the inner diameter of the flanged connections. This separation is commonly called flange rotation. The more torque is applied on flanges, the more the inner diameter will open up. Flange rotation is further increased by pressure within the pipes from the flow of liquid and gaseous fluids. All currently available retainers have parallel surfaces because they are manufactured from sheet form. They do not account for flange rotation, so the force of the bolt load is concentrated where the outer edge of the flange and retainer meet. This means that the sealing elements are not supported by the retainer, and the sealing elements can extrude into the gap causing wear, reduced life expectancy and even failure.

The non-metallic flange isolation gasket kit mitigates the effects of flange rotation by the tapering of the retainer (100) as described above. Having the retainer surfaces be tapered allows for a small degree of flange rotation that maximizes seal seating and counteracts internal pressure forces. The taper angle beta β is the angle which the tapered upper surface (110) and the tapered lower surface (112) are oriented relative to the retainer radial axis (104). The taper angle beta β should match the flange rotation angle calculated based on flange rotation data derived from the required torque and pressure forces exerted on the flanges based on industry standards. FIG. 8a is an enlarged view of the cross section of one side of the retainer (100) at the retainer inner diameter surface (116), showing the taper angle beta β of the tapered lower surface (112).

The retainer (100) is made to match the contour of the flange, which allows the bolt load to be more effective and more consistent right where it matters, at the interface between the seal (120) and the flange face (204).

The seal (120) provides the sealing functionality of the non-metallic flange isolation gasket kit. The retainer (100) provides a structure for the seal (120) to sit on, with a precise thickness and consistent compressive strength so that the sealing functionality of the seal (120) remains optimum. The seal (120) is a disk like structure is joined to the retainer (100). The seal (120) is comprised of a seal outer diameter surface (122), a seal inner diameter surface (126), a seal upper surface (134) and a seal lower surface (136). The seal (120) is made from a fluoropolymer material that is compatible with high pressure, high temperature and chemical corrosion environments, such as PTFE.

Figure 10:
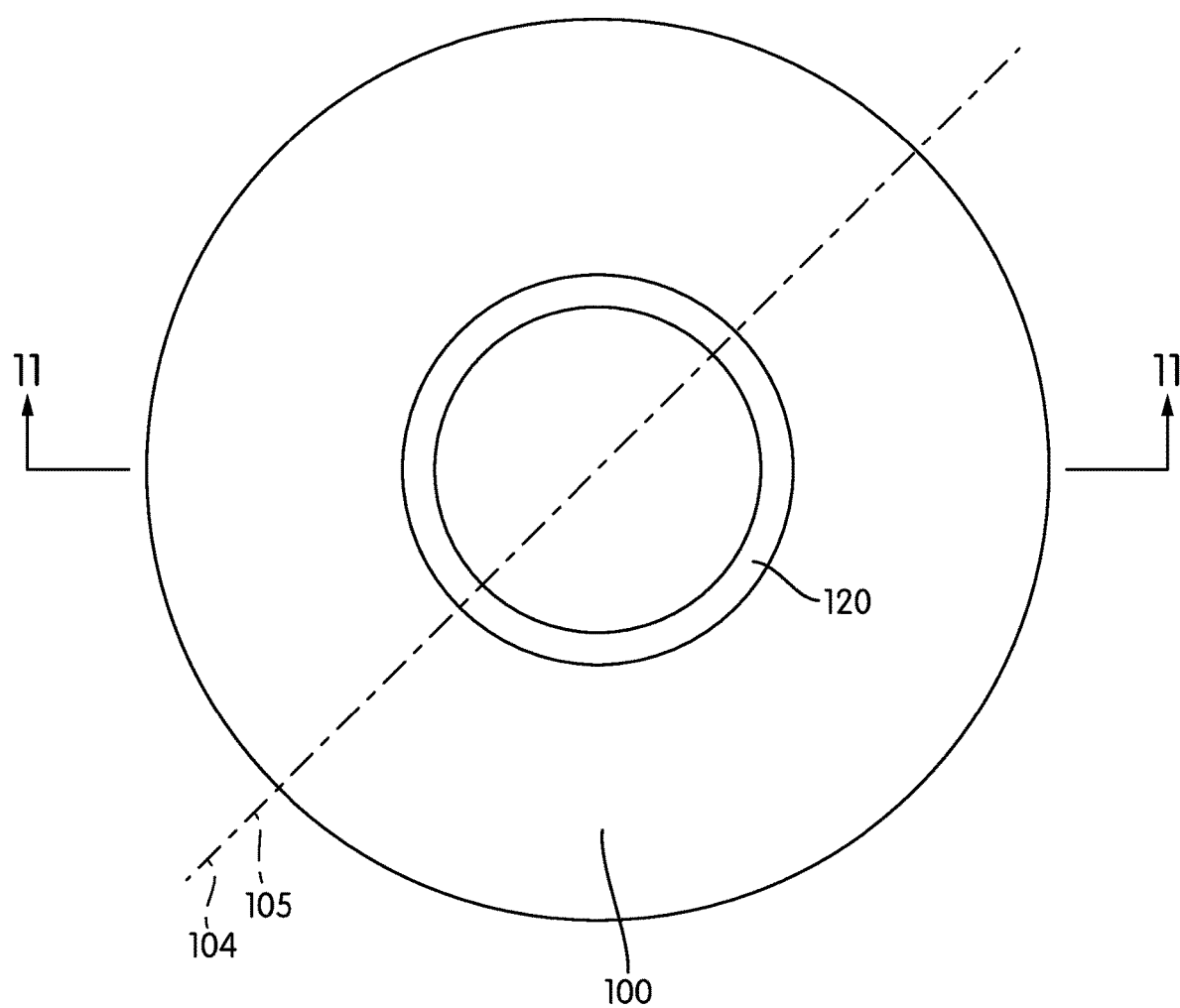
FIG. 10 is a top view of the seal (120) joined to the retainer (100). The retainer radial axis (104) and the seal radial axis (105) are shown for reference purposes.
Figure 11:
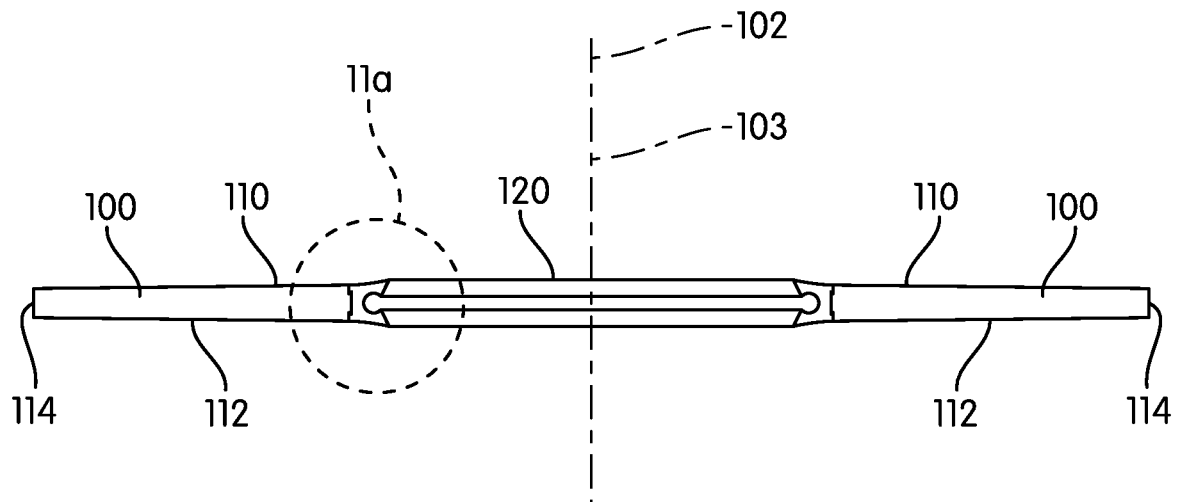
FIG. 11 shows a sectional view of the seal (120) joined to the retainer (100) of FIG. 10 taken at the sectioning plane and in the direction indicated by section lines 11-11. The retainer central axis (102) and the seal central axis (103) are shown for reference purposes.
Figure 11A:
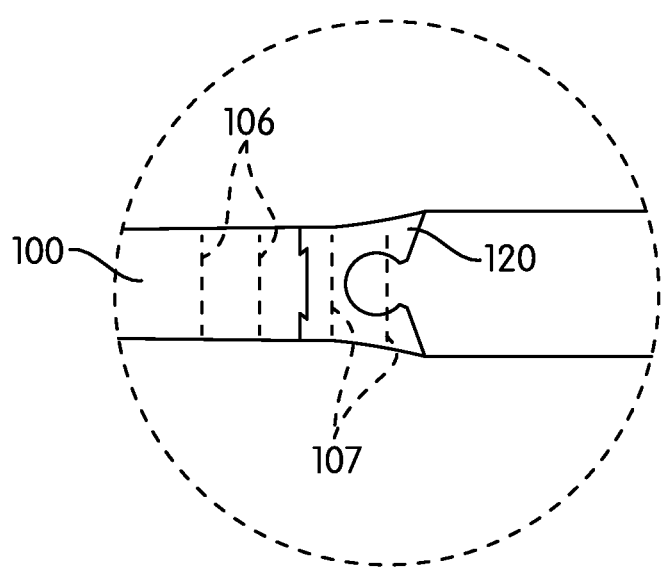
FIG. 11*a* is an enlarged view of the seal (120) joined to the retainer (100) of FIG. 10 taken at the sectioning plane and in the direction indicated by section lines 11-11. The seal thickness (107) is shown at two points parallel to the seal central axis (103). The retainer thickness (106) is shown at two points parallel to the retainer central axis (102).

The seal (120) is joined to the retainer (100) through mechanical fastening, adhesive bonding, or a combination of both mechanical fastening and adhesive bonding. FIG. 10 is a top view of the seal (120) joined to the retainer (100). The retainer radial axis (104) and the seal radial axis (105) are shown for reference purposes. FIG. 11 shows a sectional view of the seal (120) joined to the retainer (100) of FIG. 10 taken at the sectioning plane and in the direction indicated by section lines 11-11. The retainer central axis (102) and the seal central axis (103) are shown for reference purposes. FIG. 11a is an enlarged view of the seal (120) joined to the retainer (100) of FIG. 10 taken at the sectioning plane and in the direction indicated by section lines 11-11. The seal thickness (107) is shown at two points parallel to the seal central axis (103). The retainer thickness (106) is shown at two points parallel to the retainer central axis (102).

When two objects are joined to each other through mechanical fastening, a male interlock end is inserted into a female interlock end, securing the two objects together in one or more dimensions. Examples of shapes that allow for mechanical fastening include tongue and groove, T-slot finger and notch, dovetailed finger and notch, and V-shape finger and notch. The selection of the appropriate shape for the male and female interlock ends needs to take into account the various operational force vectors present in the non-metallic flange isolation gasket kit. The interlocking ends mechanically fasten the seal (120) to the retainer (100), preventing the seal (120) from detaching from the retainer, eliminating potential damage caused by rapid gas decompression, (i.e. explosive decompression), a common failure mechanism in high pressure high temperature elastomeric seals.

Figure 12:
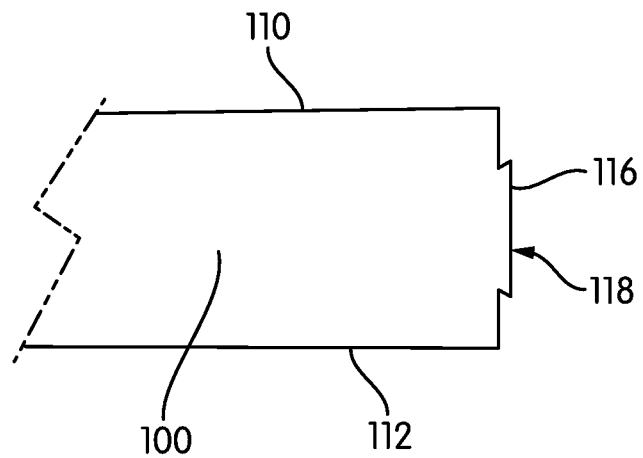
FIG. 12 shows the cross section of the retainer (100) at the retainer inner diameter surface (116). The retainer inner diameter surface (116) comprises of male retainer interlock end (118) in the shape of a tapered T-Slot.
Figure 13:
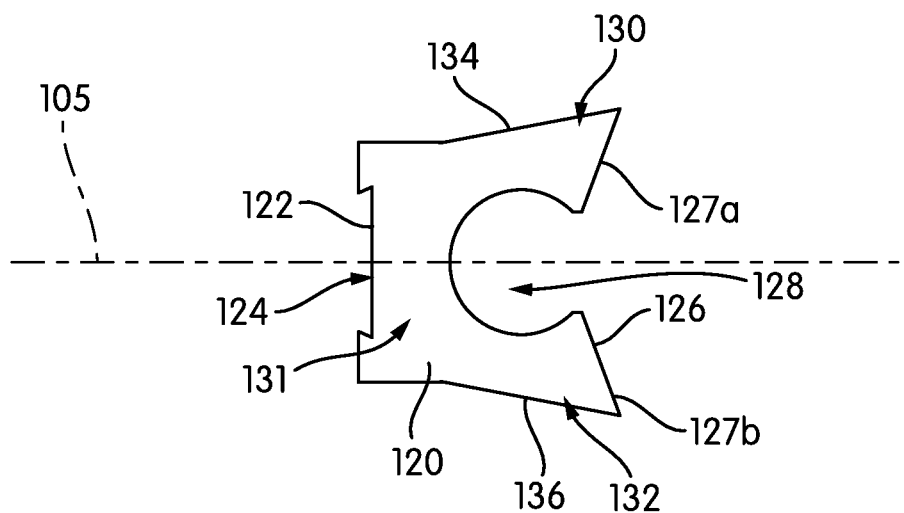
FIG. 13 shows the cross section of the seal (120) were the seal inner diameter surface (126) comprises the upper facing surface (127*a*), the lower facing surface (127*b*), and the seal pre-load cavity (128). The seal pre-load cavity (128) within the seal (120) makes the cross-sectional shape of the seal (120) U shaped; this cross-sectional shape has three sections: a seal base (131), an upper sealing lip (130) and a lower sealing lip (132). The upper sealing lip (130) and the lower sealing lip (132) have a positive rake shape. The seal outer diameter surface (122) comprises a female seal interlock end (124) in the shape of a tapered T-slot.

In a first embodiment of mechanical fastening, the retainer inner diameter surface (116) comprises of a male retainer interlock end (118) and the seal outer diameter surface (122) comprises of a female seal interlock end (124). FIG. 12 shows the cross section of the retainer (100) at the retainer inner diameter surface (116). The retainer inner diameter surface (116) comprises of a male retainer interlock end (118) in the shape of a tapered T-Slot. FIG. 13 shows the cross section of the seal (120), where the seal outer diameter surface (122) is comprised of a female seal interlock end (124) in the shape of a tapered T-slot.

Figure 14:
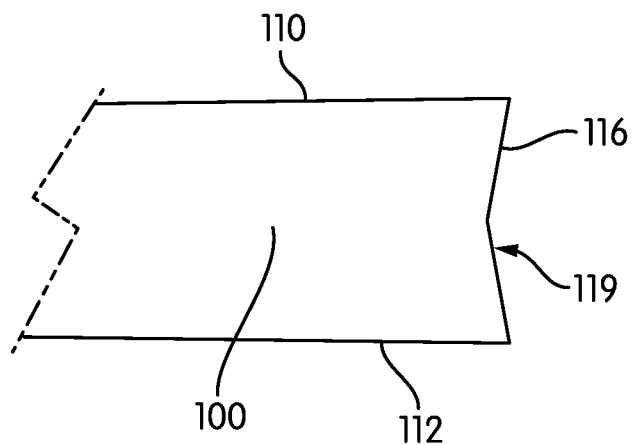
FIG. 14 shows the cross section of the retainer (100) at the retainer inner diameter surface (116). The retainer inner diameter surface (116) comprises of a female retainer interlock end (119) in a V-shape.
Figure 15:
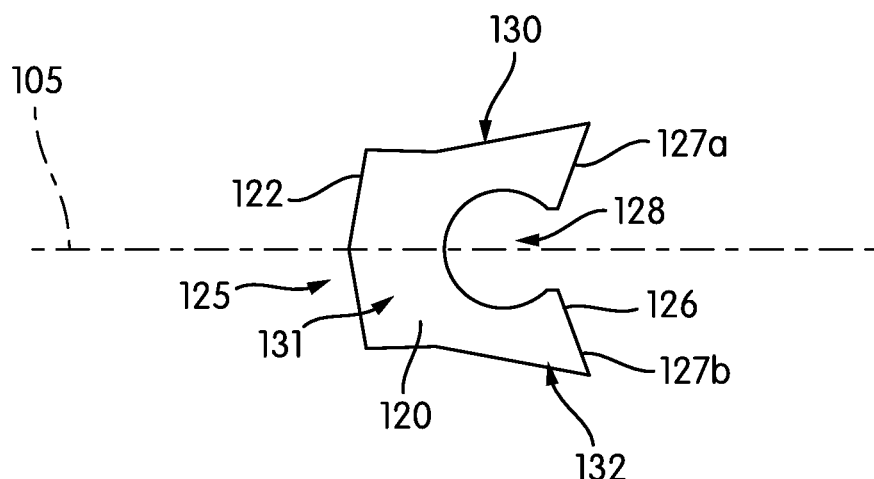
FIG. 15 shows the cross section of the seal (120), where the seal inner diameter surface (126) comprises the upper facing surface (127*a*), the lower facing surface (127*b*), and the seal pre-load cavity (128). The upper sealing lip (130) and the lower sealing lip (132) have a positive rake shape. The seal outer diameter surface (122) comprises a male seal interlock end (125) in a "V" shape.

In a second embodiment of mechanical fastening, the retainer inner diameter surface (116) is comprised of a female retainer interlock end (119) and the seal outer diameter surface (122) is comprised of a male seal interlock end (125). FIG. 14 shows the cross section of the retainer (100) at the retainer inner diameter surface (116). The retainer inner diameter surface (116) comprises of a female retainer interlock end (119) in a V-shape. FIG. 15 shows the cross section of the seal (120), where the seal inner diameter surface (126) comprises the upper facing surface (127a), the lower facing surface (127b), and the seal pre-load cavity (128). The upper sealing lip (130) and the lower sealing lip (132) have a positive rake shape. The seal outer diameter surface (122) comprises a male seal interlock end (125) in a "V" shape.

Figure 15A:
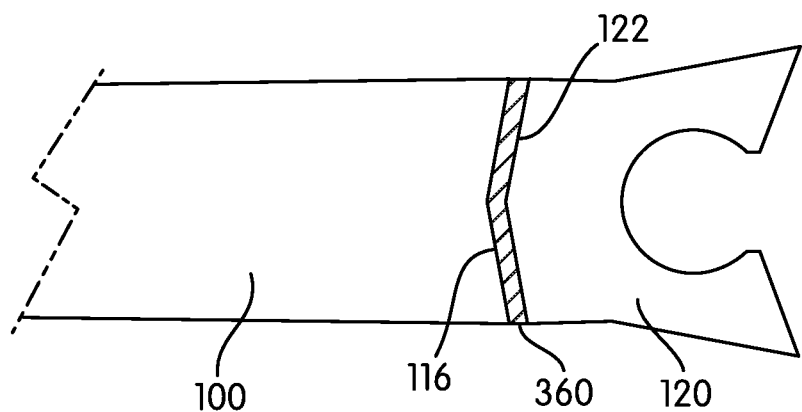
FIG. 15*a* shows the retainer (100) joined to the seal (120). The retainer inner diameter surface (116) is joined to the seal outer diameter surface (122) through adhesive bonding. An adhesive (360) is applied between the retainer inner diameter surface (116) and the seal outer diameter surface (122). The cross section of the retainer inner diameter surface (116) and the seal outer diameter surface (122) have a "V" profile.

When two objects are joined to each other through adhesive bonding, an adhesive (360) is applied between the two objects. To join the seal (120) and the retainer (100) to each other through adhesive bonding, an adhesive (360) is applied between the retainer inner diameter surface (116) and the seal outer diameter surface (122). Adhesives that are well suited for the types of materials being utilized include structural epoxy with high bond strength as manufactured by Masterbond or Cotronics. Adhesive bonding allows the interface between the retainer inner diameter surface (116) and the seal outer diameter surface (122) to have a range of surface contours. For instance, the cross section of the retainer inner diameter surface (116) and the seal outer diameter surface (122) may be flat, "V" shaped or saw shaped. FIG. 15a shows the retainer (100) joined to the seal (120). The retainer inner diameter surface (116) is joined to the seal outer diameter surface (122) through adhesive bonding. An adhesive (360) is applied between the retainer inner diameter surface (116) and the seal outer diameter surface (122). The cross section of the retainer inner diameter surface (116) and the seal outer diameter surface (122) have a "V" profile.

Adhesive bonding strength can be improved by conditioning the surfaces with pre-treatments such as abrasion, solvent cleaning, and chemical cleaning. One chemical cleaning pre-treatment that is well suited for the types of materials being utilized is chemical etching, where a chemical etchant removes both the oxides and part of the underlying surface. Sodium naphthalene is the active ingredient in many common fluoropolymer pre-treatment chemical etchants (e.g. FluoroEtch, manufactured by Acton Technologies). Other active ingredients known in the industry that have this etching property may be substituted for Sodium Naphthalene.

Figure 9:
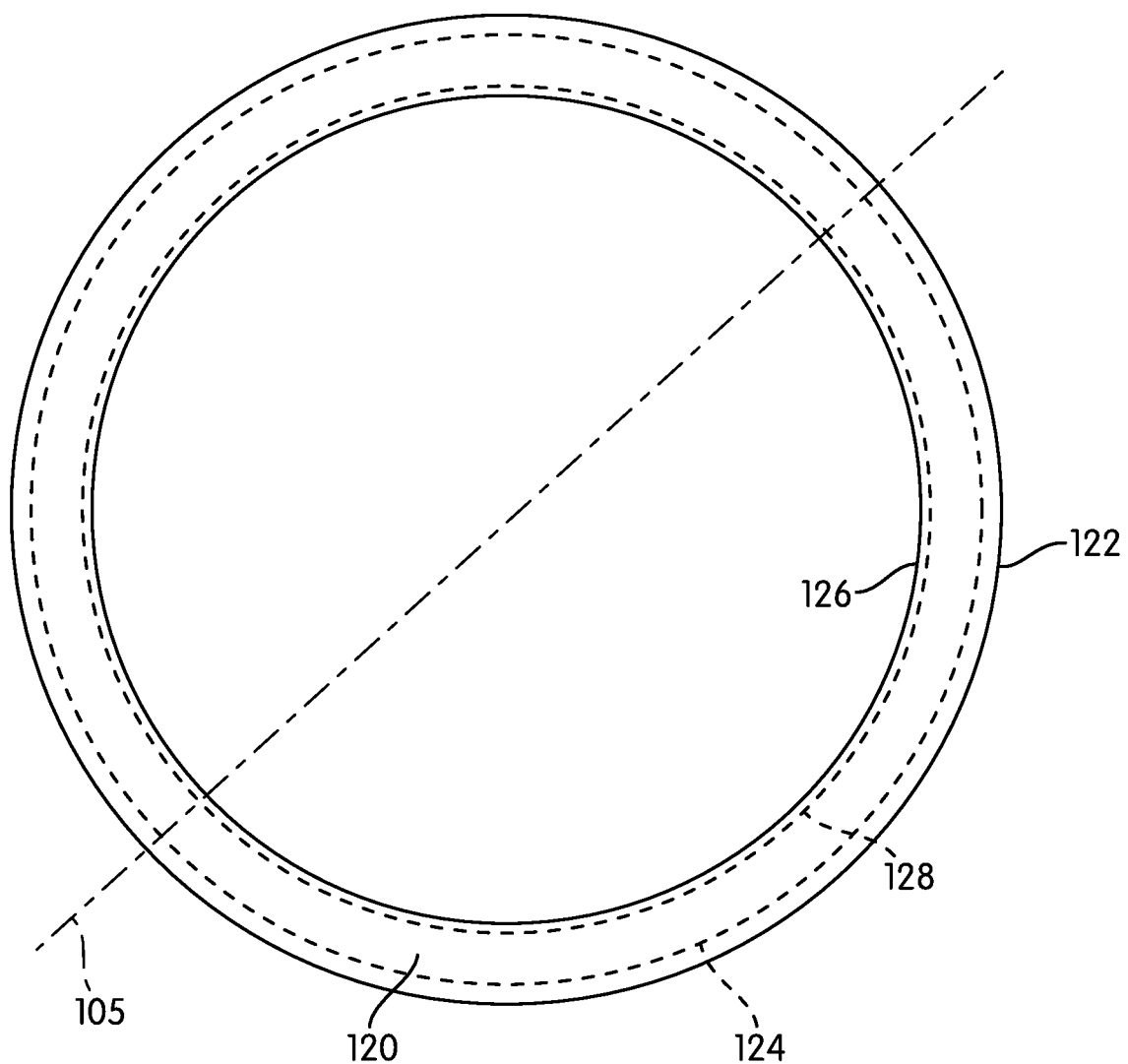
FIG. 9 is a top view of the seal (120), with the seal outer diameter surface (122) comprising of a female seal interlock end (124) and the seal inner diameter surface (126) comprising of a seal pre-load cavity (128). The seal radial axis (105) is shown for reference purposes.

The seal inner diameter surface (126) comprises an upper facing surface (127a), a lower facing surface (127b) and an indentation concentric to the seal central axis (103); this indentation is also called a seal pre-load cavity (128). FIG. 9 is a top view of the seal (120), with the seal outer diameter surface (122) comprising of a female seal interlock end (124) and the seal inner diameter surface (126) comprising of a seal pre-load cavity (128). The seal radial axis (105) is shown for reference purposes.

A seal pre-load structural ring (140) can be inserted within the seal pre-load cavity (128). The cross-sectional shape of the seal pre-load cavity (128) can be any of the state of the art shapes utilized in cavity based seals, including but not limited to concave, square, rectangular, and circular. The seal pre-load cavity (128) within the seal (120) makes the cross-sectional shape of the seal (120) U shaped; this cross-sectional shape has three sections: a seal base (131), an upper sealing lip (130) and a lower sealing lip (132). The upper facing surface (127a) can be parallel to the seal central axis (103) ("parallel profile"), angled relative to the seal central axis (103) ("angled profile"), or a hybrid of the parallel profile and the angled profile ("hybrid profile"). Collectively, the angled profile, the parallel profile, and the hybrid profile are called the edge profiles. The lower facing surface (127b) can also have a parallel profile, an angled profile, or a hybrid profile. These edge profiles can be combined to create a variety of sealing lip shapes. The shape of the upper sealing lip (130) and the lower sealing lip (132) can be any of the state of the art shapes utilized in cavity based seals, including but not limited to beveled, back-beveled, scraper, radius, beaded, and positive rake. FIG. 13 shows the cross section of the seal (120) where the seal inner diameter surface (126) comprises the upper facing surface (127a), the lower facing surface (127b), and the seal pre-load cavity (128). The seal pre-load cavity (128) within the seal (120) makes the cross-sectional shape of the seal (120) U shaped; this cross-sectional shape has three sections: a seal base (131), an upper sealing lip (130) and a lower sealing lip (132). The upper sealing lip (130) and the lower sealing lip (132) have a positive rake shape. The seal outer diameter surface (122) comprises a female seal interlock end (124) in the shape of a tapered T-slot.

The seal pre-load structural ring (140) is a structure shaped like a ring, made out of materials with elastic properties. A preferred embodiment of the seal pre-load structural ring (140) is a helical spring ring (141) made out of stainless steel, elgiloy or hasteloy. A second preferred embodiment of the seal pre-load structural ring (140) is an O-Ring (142) made from materials with viscoelasticity properties that is having both viscosity and elasticity. These materials may be either occurring naturally, e.g. natural rubber, or produced synthetically, e.g. polymers (elastomers). The O-Ring (142) may be either hollow or solid. Other embodiments of the seal pre-load structural ring (140) include but are not limited to cantilever springs (143), elliptical coil springs (144), or continuous springs (145).

The seal pre-load structural ring (140) is inserted within the seal pre-load cavity (128), creating an energized seal that creates a very effective seal design for low and high fluid pressure application. The seal pre-load structural ring (140) comes under compression, that is "pre-loading", applying a force on the surface of the seal pre-load cavity (128) and the upper sealing lip (130) and the lower sealing lip (132); this creates a tight barrier between the seal (120) and the flange faces (204) to prevent fluids from leaking at low fluid pressure. At high fluid pressure situations, the fluid pressure augments the pre-load structural ring compression, providing a tighter barrier between the seal (120) and the flange faces (204). Proper seal design for low and high-pressure performance requires a specific compression of the upper sealing lip (130) and the lower sealing lip (132) around the seal pre-load structural ring (140). The specific "pre-loading" pressure exerted by the seal pre-load structural ring (140) enhances sealing performance.

The seal thickness (107) is defined as the distance between the seal upper surface (134) and the seal lower surface (136) perpendicular to the seal radial axis (105). The seal width (108) is defined as the distance between the seal inner diameter surface (126) and the seal outer diameter surface (122), parallel to the seal radial axis (105).

Because the seal (120) is joined to the retainer inner diameter surface (116), this design allows the seal (120) to have a significant gain in sealing surface with the flange faces (204) and in cross section (thickness times width) compared to seals utilized in currently available flange insolation gaskets. This greater cross section and gain in sealing surface allows the seal (120) to be better protected from extrusion at high fluid pressures and to maintain the seal's shape under heavy flange loads.

Figure 16:
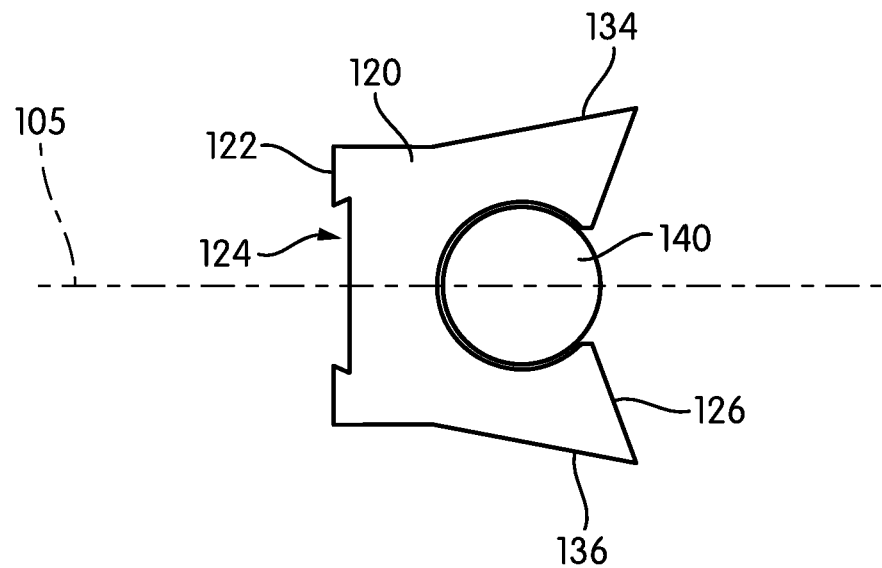
FIG. 16 shows the cross section of the seal pre-load structural ring (140) inserted within the seal pre-load cavity (128) of the seal (120) where the seal is in an uncompressed state. The seal upper surface (134) and the seal lower surface (136) taper symmetrically along the seal radial axis (105). The tapering is partial as there are segments in the seal upper surface (134) and the seal lower surface (136) where there is no taper.
Figure 17:
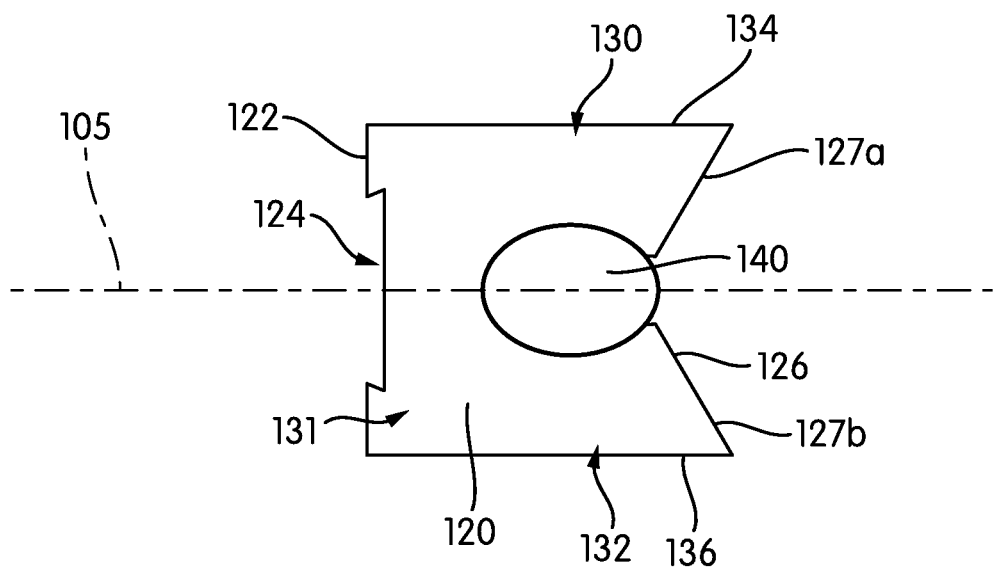
FIG. 17 shows the cross section of the seal pre-load structural ring (140) inserted within the seal pre-load cavity (128) of the seal (120) where the seal is in a compressed state.

For the seal (120) to provide proper sealing and pre-loading characteristics, some of the seal thickness (107) in an uncompressed state needs to be greater than the retainer thickness (106) at the retainer inner diameter surface (116). This can be achieved in a number of geometrical configurations. In one configuration, the seal thickness (107) may taper towards the seal outer diameter surface (122). In other words, the seal thickness (107) decreases from the seal inner diameter surface (126) towards the seal outer diameter surface (122). The tapering may be continuous or it may partial, that is, there might be some segments of the seal where there is no tapering. The tapering of the seal upper surface (134) and the seal lower surface (136) is preferably symmetrical along the seal radial axis (105). FIG. 16 shows the cross section of the seal pre-load structural ring (140) inserted within the seal pre-load cavity (128) of the seal (120) where the seal is in an uncompressed state. The seal upper surface (134) and the seal lower surface (136) taper symmetrically along the seal radial axis (105). The tapering is partial as there are segments in the seal upper surface (134) and the seal lower surface (136) where there is no taper. FIG. 17 shows the cross section of the seal pre-load structural ring (140) inserted within the seal pre-load cavity (128) of the seal (120) where the seal (120) is in a compressed state.

In another configuration, the seal upper surface (134) and the seal lower surface (136) may have one or more annular ridges (138). The annular ridge (138) is concentric to the seal central axis (103). The cross section of the annular ridge (138) may have a number of shapes, including triangular, square, dome, and convex-shaped.

Figure 18:
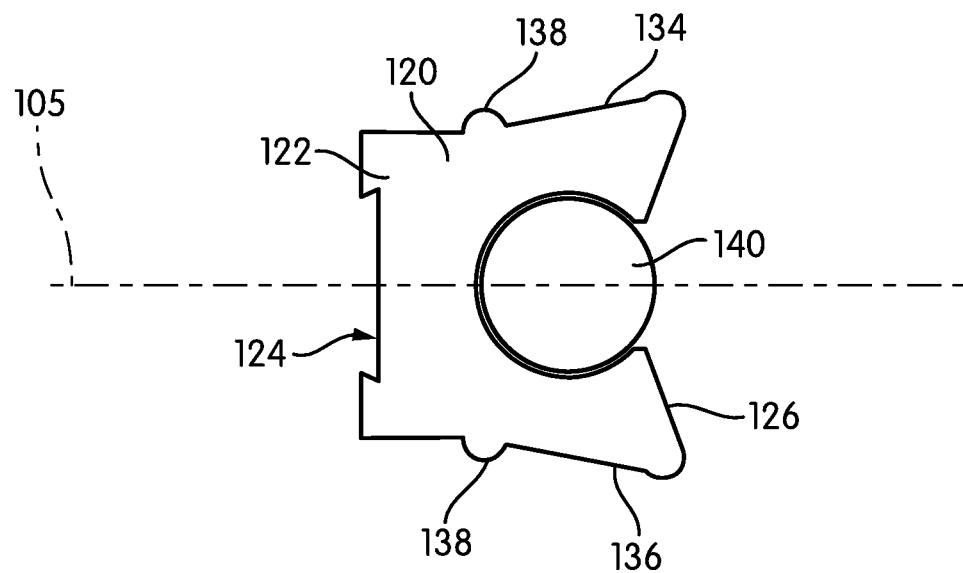
FIG. 18 shows the cross section of the seal pre-load structural ring (140) inserted within the seal pre-load cavity (128) of the seal (120) in an uncompressed state. The seal upper surface (134) and the seal lower surface (136) taper symmetrically along the seal radial axis (105). The tapering is partial as there are segments in the seal upper surface (134) and the seal lower surface (136) where there is no taper. The seal upper surface (134) and the seal lower surface (136) have two annular ridges (138) with a concave cross section.
Figure 19:
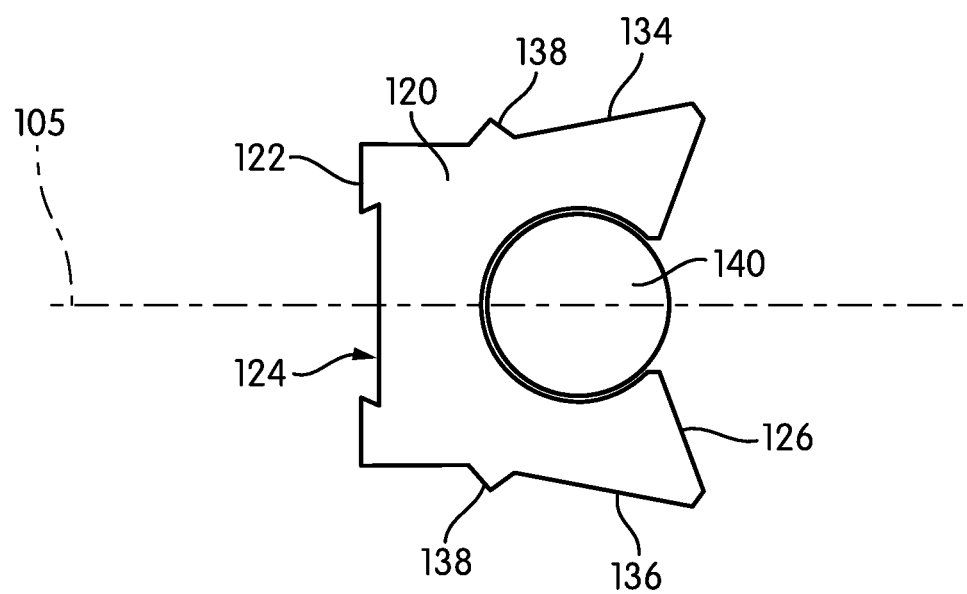
FIG. 19 shows the cross section of the seal pre-load structural ring (140) inserted within the seal pre-load cavity (128) of the seal (120) in an uncompressed state. The seal upper surface (134) and the seal lower surface (136) taper symmetrically along the seal radial axis (105). The tapering is partial as there are segments in the seal upper surface (134) and the seal lower surface (136) where there is no taper. The seal upper surface (134) and the seal lower surface (136) have one annular ridge (138) with a triangular cross section.

In another configuration, the seal thickness (107) may taper towards the seal outer diameter surface (122), and the seal upper surface (134) and the seal lower surface (136) may have one or more annular ridges (138). The annular ridge (138) is concentric to the seal central axis (103). FIG. 18 shows the cross section of the seal pre-load structural ring (140) inserted within the seal pre-load cavity (128) of the seal (120) in an uncompressed state. The seal upper surface (134) and the seal lower surface (136) taper symmetrically along the seal radial axis (105). The tapering is partial as there are segments in the seal upper surface (134) and the seal lower surface (136) where there is no taper. The seal upper surface (134) and the seal lower surface (136) have two annular ridges (138) with a concave cross section. FIG. 19 shows the cross section of the seal pre-load structural ring (140) inserted within the seal pre-load cavity (128) of the seal (120) in an uncompressed state. The seal upper surface (134) and the seal lower surface (136) taper symmetrically along the seal radial axis (105). The tapering is partial as there are segments in the seal upper surface (134) and the seal lower surface (136) where there is no taper. The seal upper surface (134) and the seal lower surface (136) have one annular ridge (138) with a triangular cross section.

Figure 20:
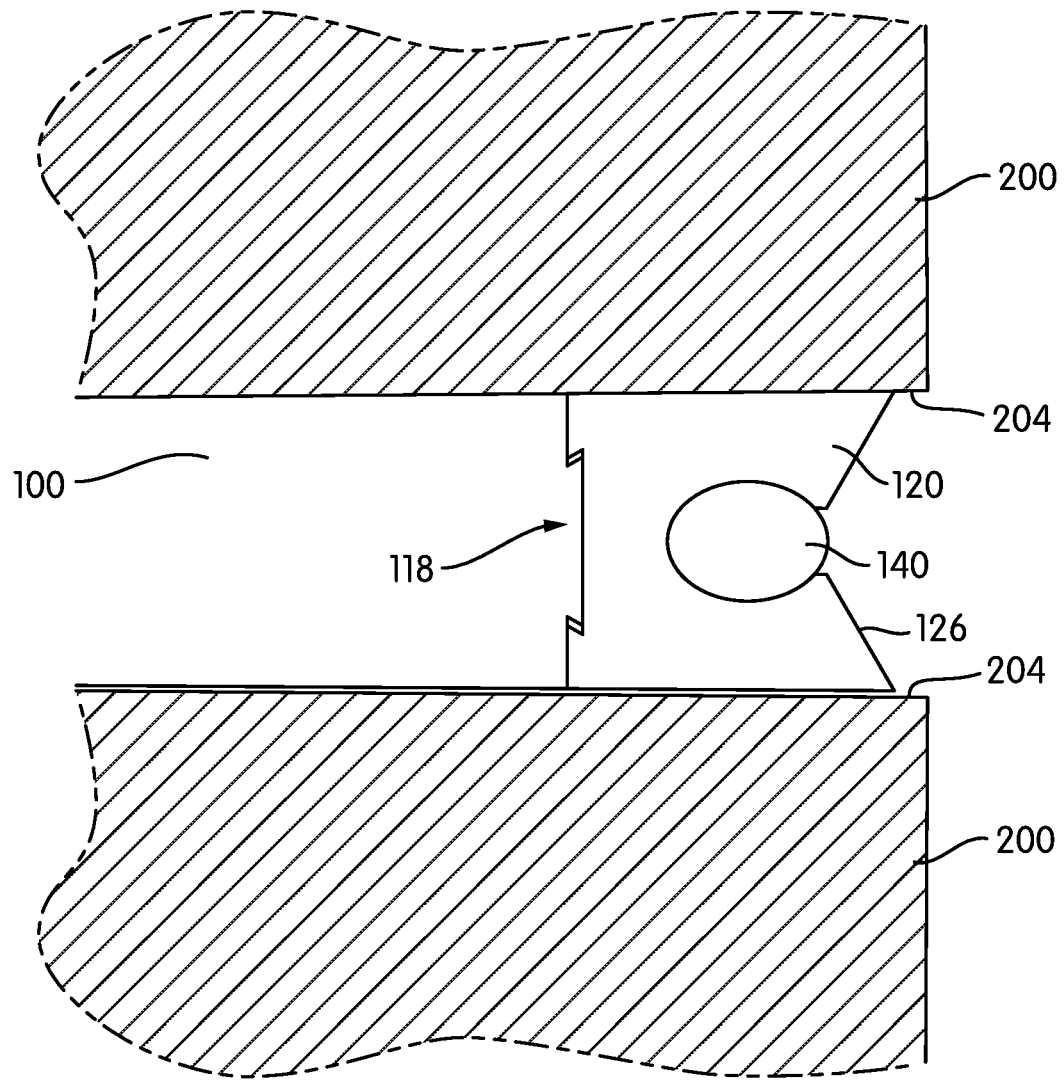
FIG. 20 shows the cross section of the non-metallic flange isolation gasket kit placed under compression between two flange faces (204). The seal (120) is mechanically fastened into the retainer (100) and the seal pre-load structural ring (140) is inserted into the seal pre-load cavity (128).
Figure 21:
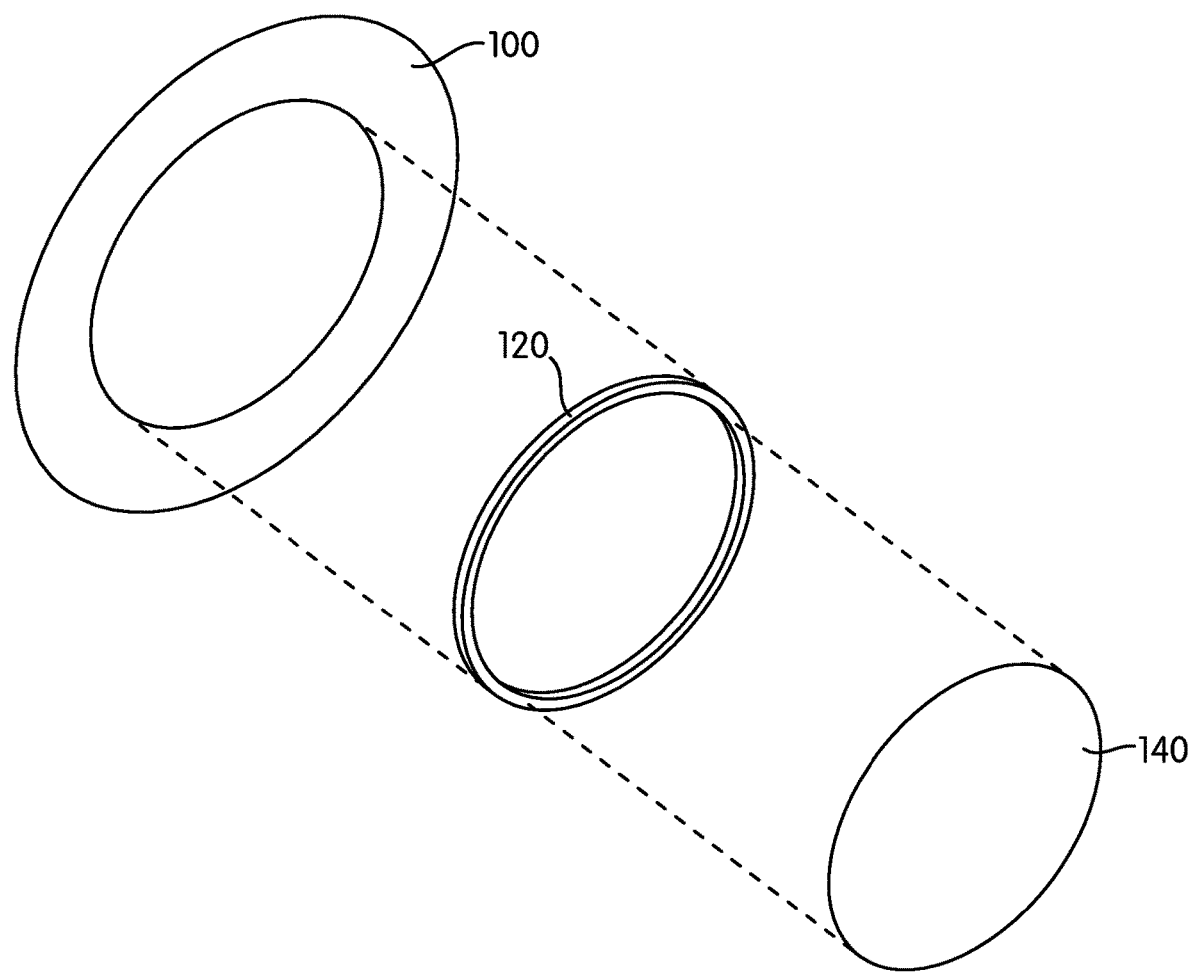
FIG. 21 shows the relative positioning of the retainer (100), the seal (120) and the seal pre-load structural ring (140).

When the non-metallic flange isolation gasket kit is placed between flange faces (204), the tapered upper surface (110) and the tapered lower surface (112) interfaces with the flange faces (204); the seal upper surface (134) and the seal lower surface (136) interfaces with the flange faces (204). FIG. 20 shows the cross section of the non-metallic flange isolation gasket kit placed under compression between two flange faces (204). The seal (120) is mechanically fastened into the retainer (100) and the seal pre-load structural ring (140) is inserted into the seal pre-load cavity (128). FIG. 21 shows the relative positioning of the retainer (100), the seal (120) and the seal pre-load structural ring (140).

Figure 22:
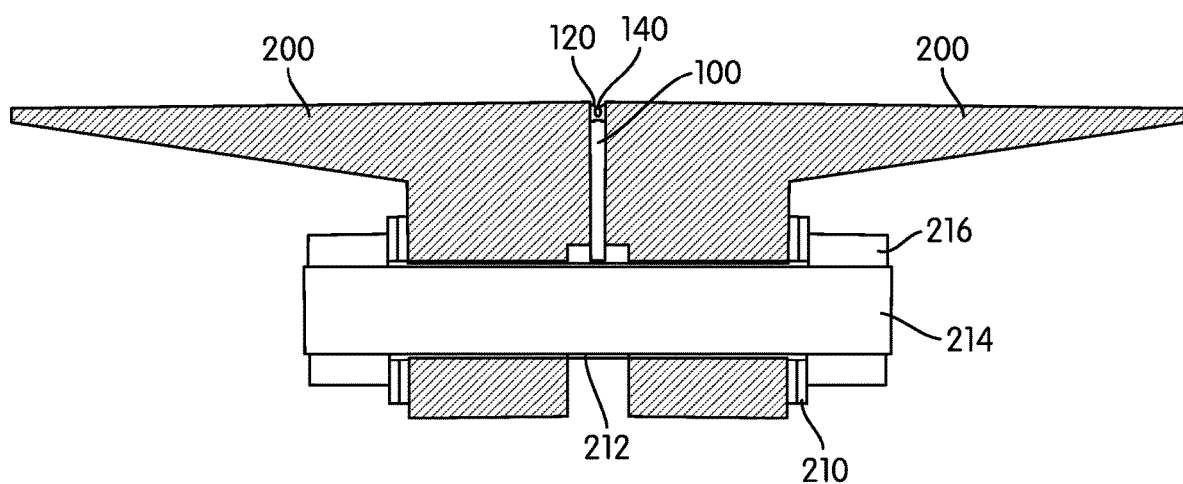
FIG. 22 shows a cross section of one side of a non-metallic flange isolation kit joining two flanges (200). A non-metallic flange isolation gasket kit is placed between the two flanges (200). The seal pre-load structural ring (140) is inserted into the seal (120), and the seal (120) is mechanically fastened to the retainer (100). The seal (120) and the retainer (100) interface with the flanges (200) at the flange faces (204). The flanges (200) are fastened together using bolts (214), nuts (216), washers (210), and bolt sleeves (212).

FIG. 22 shows a cross section of one side of a non-metallic flange kit joining two flanges (200). A non-metallic flange isolation gasket kit is placed between the two flanges (200). The seal pre-load structural ring (140) is inserted into the seal (120), and the seal (120) is mechanically fastened to the retainer (100). The seal (120) and the retainer (100) interface with the flanges (200) at the flange faces (204). The flanges (200) are fastened together using bolts (214), nuts (216), washers (210), and bolt sleeves (212).

Figure 23:
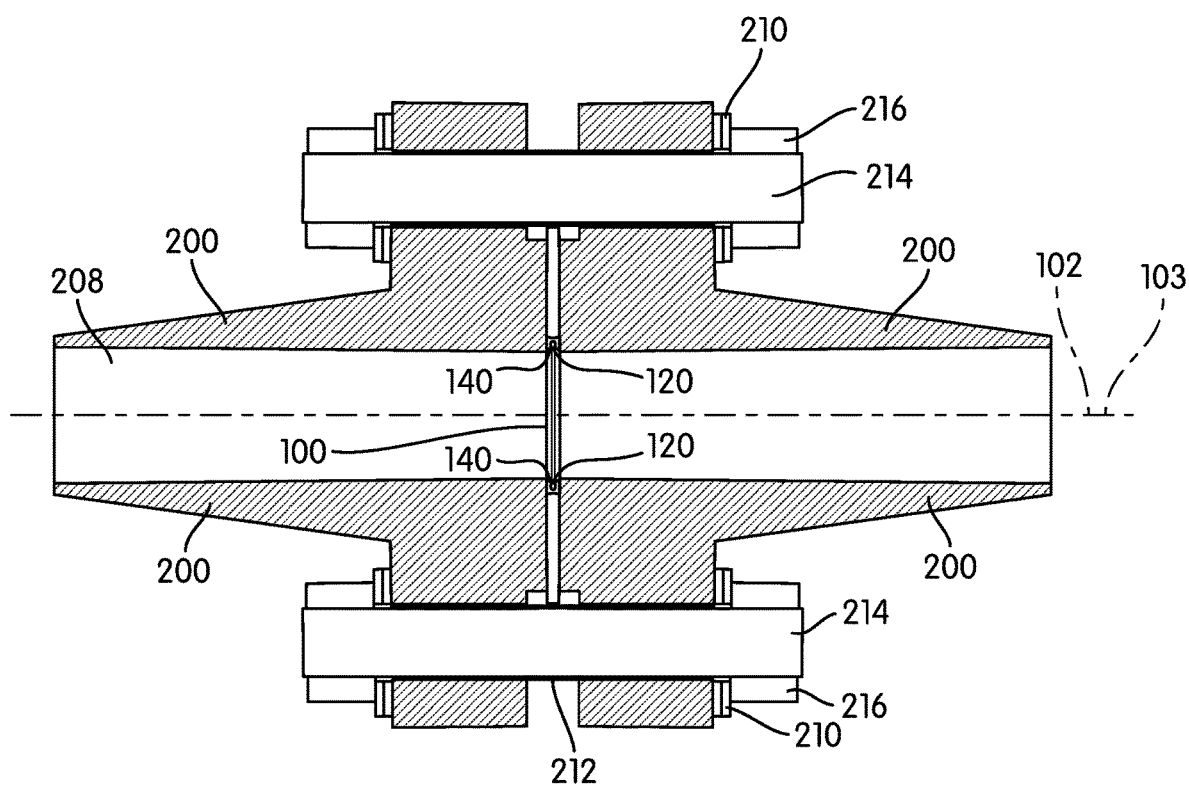
FIG. 23 shows a cross section of the non-metallic flange isolation kit joining the two flanges (200). A non-metallic flange isolation gasket kit is placed between the two flanges (200). The seal pre-load structural ring (140) is inserted into the seal (120) and the seal (120) is mechanically fastened to the retainer (100). The seal (120) and the retainer (100) interface with the flanges (200) at the flange faces (204). The flanges (200) are fastened together using bolts (214), nuts (216), washers (210), and bolt sleeves (212). The non-metallic flange isolation gasket kit prevents fluids from escaping from the fluid channel (208).

FIG. 23 shows a cross section of the non-metallic flange isolation kit joining the two flanges (200). The non-metallic flange isolation gasket kit is placed between the two flanges (200). The seal pre-load structural ring (140) is inserted into the seal (120) and the seal (120) is mechanically fastened to the retainer (100). The seal (120) and the retainer (100) interface with the flanges (200) at the flange faces (204). The flanges (200) are fastened together using bolts (214), nuts (216), washers (210), and bolt sleeves (212). The non-metallic flange isolation gasket kit prevents fluids from escaping from the fluid channel (208).

When the non-metallic flange isolation gasket kit is placed between flange faces (204), and the flanges are bolted down, a compression load is applied to the retainer (100) and the seal (120). The seal (120) shape and size geometry allow for higher compression loads to be generated at the interface between the flange face (204) and the seal (120) as compared to the interface between the flange face (204) and retainer (100). Most, if not all of the bolt load is converted into seal seating load. This seal and retainer shape and size geometry decrease the overall bolt load needed to achieve an efficient seal and to maintain this seal during pressure and temperature extremes. Because the majority of the compression loads on the retainer are exerted at the retainer's inner diameter, the tapered design of the retainer serves to support the seal as it is wedged between the flange faces at the proper angle, which improves total circumferential strength of the retainer and seal, thereby off-setting flange rotation issues.

The non-metallic flange isolation gasket kit's single seal design provides a number of advantages over currently available flange isolation gasket designs. A single seal design reduces potential catastrophic seal failure in half. A single seal design has two potential leak paths, or points of catastrophic failure. Most currently available flange isolation gasket kits in the industry have one seal on each retainer face, for a total of two seals per retainer; hence, this seal design has four leak paths. A fluoropolymer based seal improves chemical compatibility and exposure to steam as no other gasket component is in contact with media. A seal attached to the retainer's inner diameter allows for an increased seal thickness, creating a much larger electrical gap between the flanges and effectively tripling the electrical resistance and isolation property of the gasket.

(3) Composite Gasket Blank

A second embodiment of the non-metallic flange isolation gasket kit comprises of a composite gasket blank (160) and a seal pre-load structural ring (140). The composite gasket blank (160) comprises of a retainer (100) and a seal (120). The composite gasket blank (160) is made through a composite winding/wrapping process, where tube shape compression molded fluoropolymer (350) is over molded with one or more layers of impregnated composite fiber filaments (303) and one or more layers of semi-cured impregnated composite fabric matrix (326). This material is then cured and cut. The seal (120) is machined from the tube shape compression molded fluoropolymer (350) section of the composite gasket blank (160). The retainer (100) is machined from the cured filament wound material (91) and cured convolute wrapped pre-preg material (92) section of the composite gasket blank (160). The seal (120) and the retainer (100) are joined by thermal fusion bonding. Specifically, the seal outer diameter surface (122) and the retainer inner diameter surface (116) are joined by thermal fusion bonding.

Figure 24:
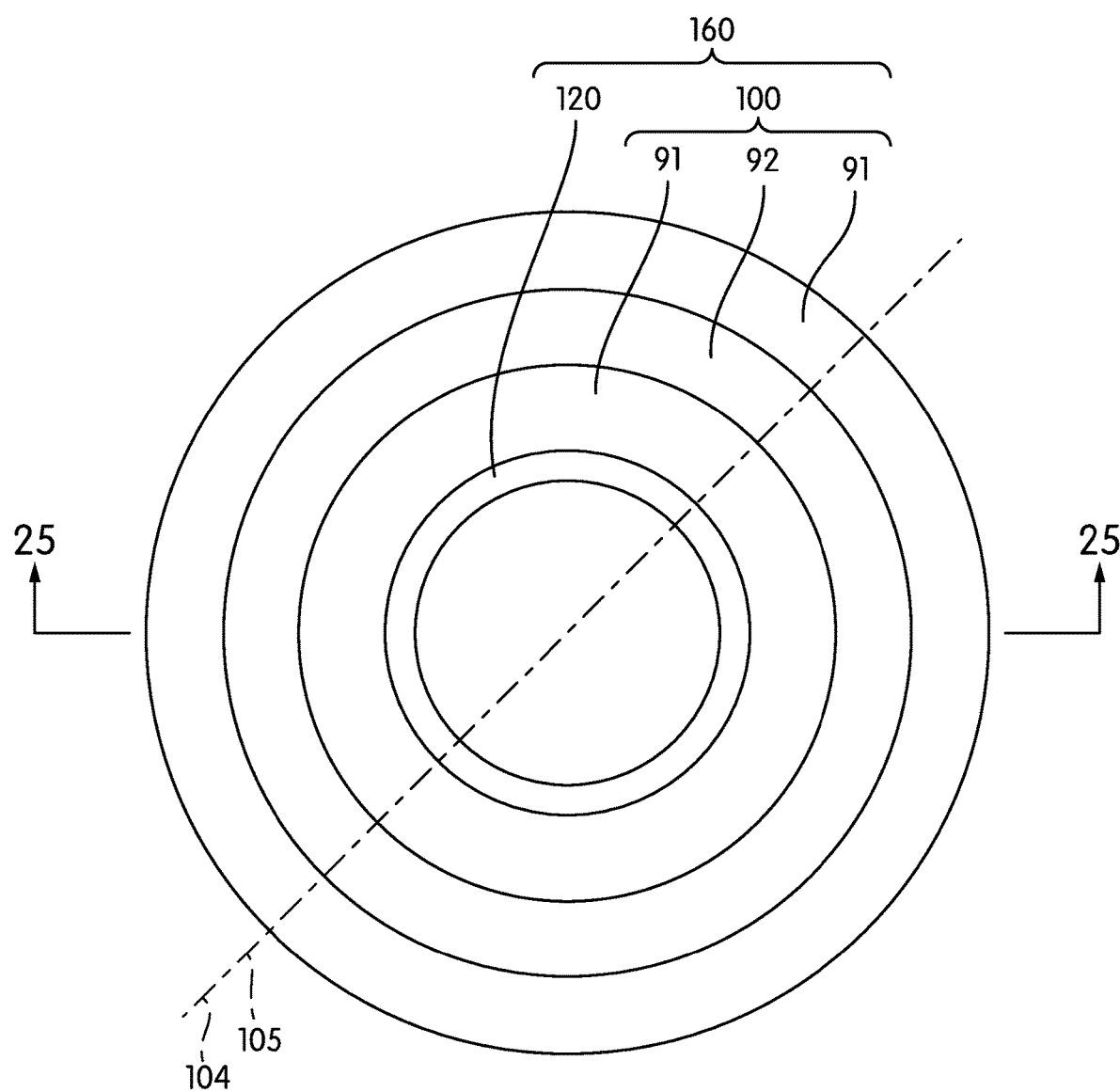
FIG. 24 is a top view of the composite gasket blank (160), comprised of the retainer (100) and the seal (120), where the retainer (100) and the seal (120) are thermal fusion bonded. The retainer (100) is comprised of a first layer of material made from cured filament wound material (91), a second layer of material made from cured convolute wrapped pre-preg material (92), and a third layer of material made from cured filament wound material (91). The retainer radial axis (104) and the seal radial axis (105) are shown for reference purposes.

FIG. 24 is a top view of the composite gasket blank (160), comprised of the retainer (100) and the seal (120), where the retainer (100) and the seal (120) are thermal fusion bonded. The retainer (100) is comprised of a first layer of material made from cured filament wound material (91), a second layer of material made from cured convolute wrapped pre-preg material (92), and a third layer of material made from cured filament wound material (91). The retainer radial axis (104) and the seal radial axis (105) are shown for reference purposes.

Figure 25:
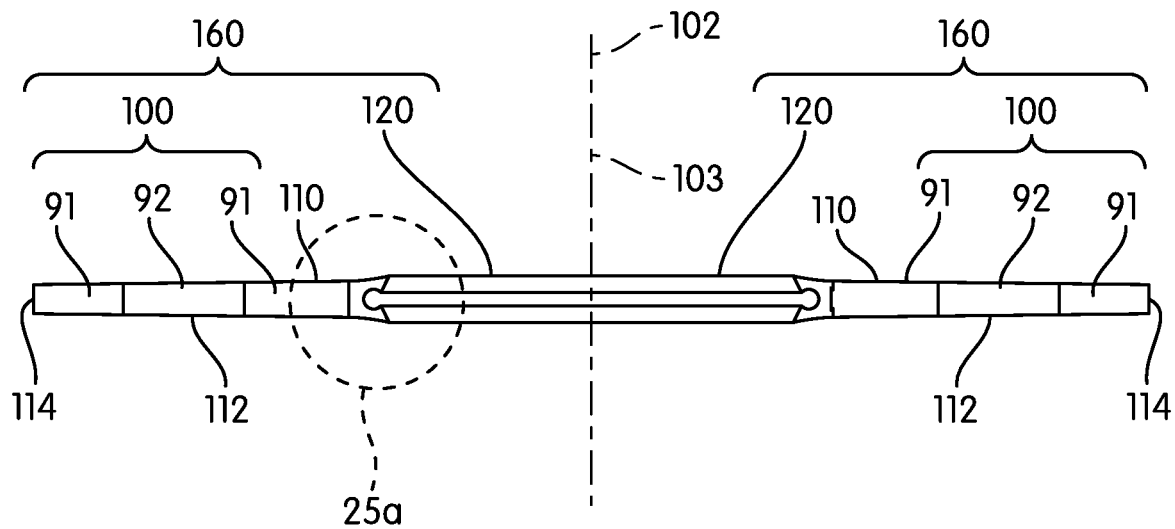
FIG. 25 shows a sectional view of the composite gasket blank (160) of FIG. 24 taken at the sectioning plane and in the direction indicated by section lines 25-25. The seal outer diameter surface (122) and the retainer inner diameter surface (116) have a flat profile. The retainer (100) is comprised of a first layer of material made from cured filament wound material (91), a second layer of material made from cured convolute wrapped pre-preg material (92), and a third layer of material made from cured filament wound material (91). The retainer central axis (102) and the seal central axis (103) are shown for reference purposes.

FIG. 25 shows a sectional view of the composite gasket blank (160) of FIG. 24 taken at the sectioning plane and in the direction indicated by section lines 25-25. The seal outer diameter surface (122) and the retainer inner diameter surface (116) have a flat profile. The retainer (100) is comprised of a first layer of material made from cured filament wound material (91), a second layer of material made from cured convolute wrapped pre-preg material (92), and a third layer of material made from cured filament wound material (91). The retainer central axis (102) and the seal central axis (103) are shown for reference purposes.

Figure 25A:
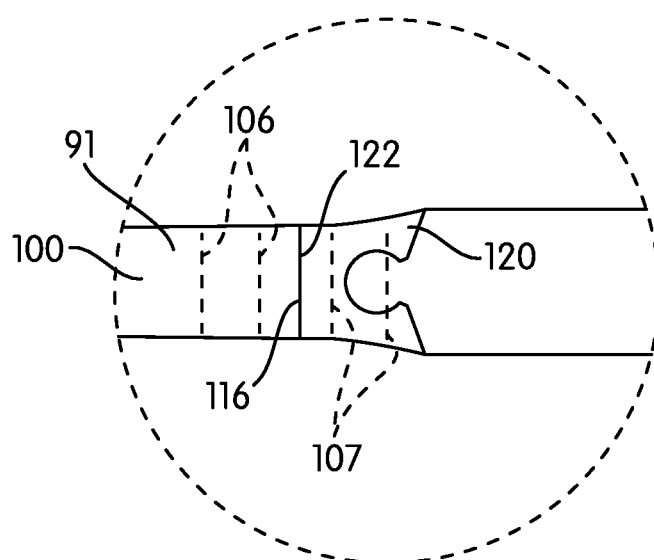
FIG. 25*a* is an enlarged view of the sectional view of the composite gasket blank (160) of FIG. 24 taken at the sectioning plane and in the direction indicated by section lines 25-25. The seal thickness (107) is shown at two points parallel to the seal radial axis (105). The seal outer diameter surface (122) and the retainer inner diameter surface (116) are thermal fusion bonded. The seal outer diameter surface (122) and the retainer inner diameter surface (116) have a flat profile. The retainer thickness (106) is shown at two points parallel to the retainer radial axis (104). The retainer's (100) first layer of material made from cured filament wound material (91) is shown.

FIG. 25a is an enlarged view of the sectional view of the composite gasket blank (160) of FIG. 24 taken at the sectioning plane and in the direction indicated by section lines 25-25. The seal thickness (107) is shown at two points parallel to the seal central axis (103). The seal outer diameter surface (122) and the retainer inner diameter surface (116) are thermal fusion bonded. The seal outer diameter surface (122) and the retainer inner diameter surface (116) have a flat profile. The retainer thickness (106) is shown at two points parallel to the retainer central axis (102). A first layer of material made from cured filament wound material (91) is shown within the retainer (100).

Figure 26:
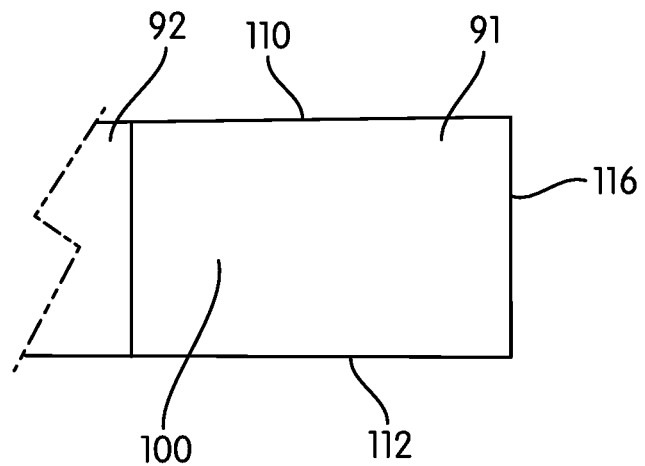
FIG. 26 shows the cross section of the retainer (100) at the retainer inner diameter surface (116). The cross section of the retainer inner diameter surface (116) is flat. The tapered upper surface (110) and the tapered lower surface (112) are also shown. A first layer of material made from cured filament wound material (91) and a second layer of material made from cured convolute wrapped pre-preg material (92) are shown within the retainer (100)
Figure 27:
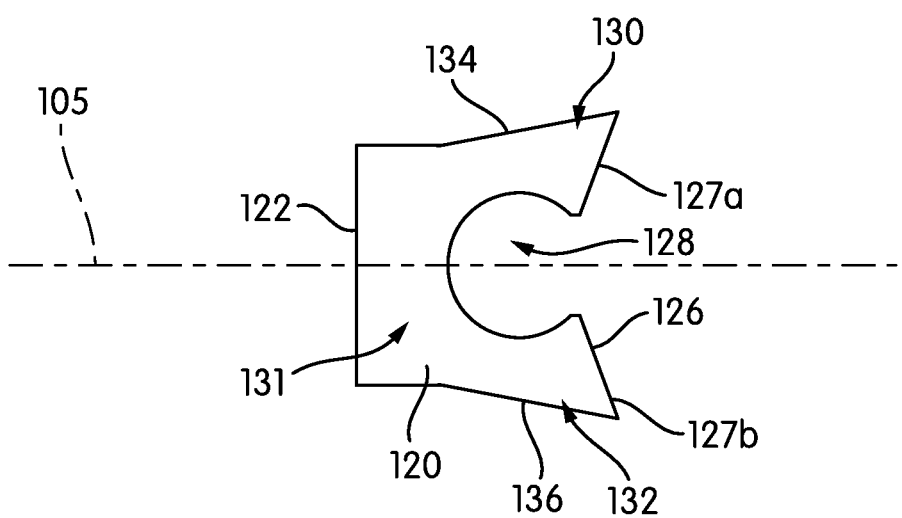
FIG. 27 shows the cross section of the seal (120) where the seal inner diameter surface (126) comprises the upper facing surface (127*a*), the lower facing surface (127*b*), and the seal pre-load cavity (128). The seal pre-load cavity (128) within the seal (120) makes the seal (120) U shaped with three sections: a seal base (131), an upper sealing lip (130) and a lower sealing lip (132). The upper sealing lip (130) and the lower sealing lip (132) have a positive rake shape. The cross section of the seal outer diameter surface (122) is flat.

FIG. 26 shows the cross section of the retainer (100) at the retainer inner diameter surface (116). The cross section of the retainer inner diameter surface (116) is flat. The tapered upper surface (110) and the tapered lower surface (112) are also shown. A first layer of material made from cured filament wound material (91) and a second layer of material made from cured convolute wrapped pre-preg material (92) are shown within the retainer (100). FIG. 27 shows the cross section of the seal (120) where the seal inner diameter surface (126) comprises the upper facing surface (127a), the lower facing surface (127b), and the seal pre-load cavity (128). The seal pre-load cavity (128) within the seal (120) makes the seal (120) U shaped with three sections: a seal base (131), an upper sealing lip (130) and a lower sealing lip (132). The upper sealing lip (130) and the lower sealing lip (132) have a positive rake shape. The cross section of the seal outer diameter surface (122) is flat.

Figure 28:
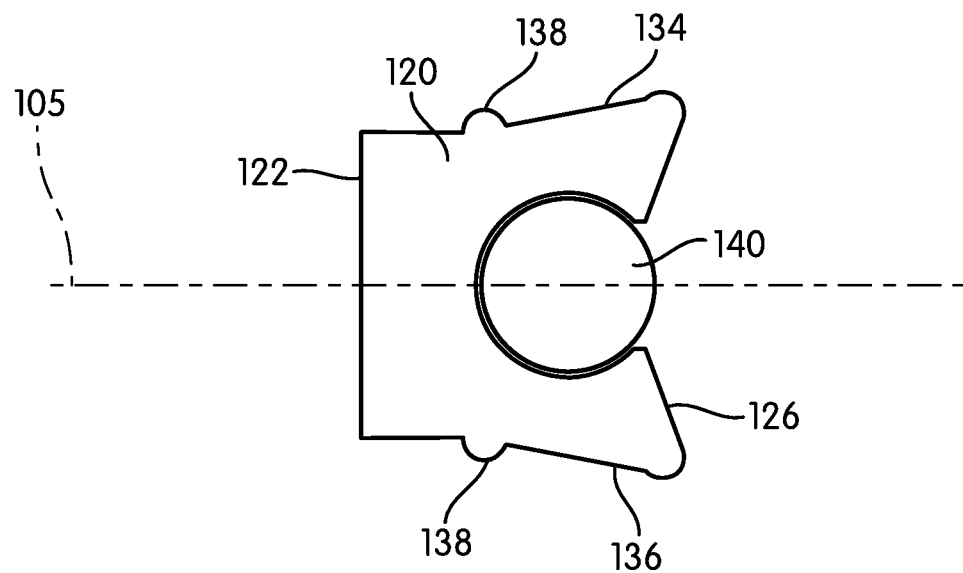
FIG. 28 shows the cross section of the seal pre-load structural ring (140) inserted within the seal pre-load cavity (128) of the seal (120) in an uncompressed state. The seal upper surface (134) and the seal lower surface (136) taper symmetrically along the seal radial axis (105). The tapering is partial as there are segments in the seal upper surface (134) and the seal lower surface (136) where there is no taper. The seal upper surface (134) and the seal lower surface (136) have an annular ridge (138) with a concave cross section. The cross section of the seal outer diameter surface (122) is flat.
Figure 29:
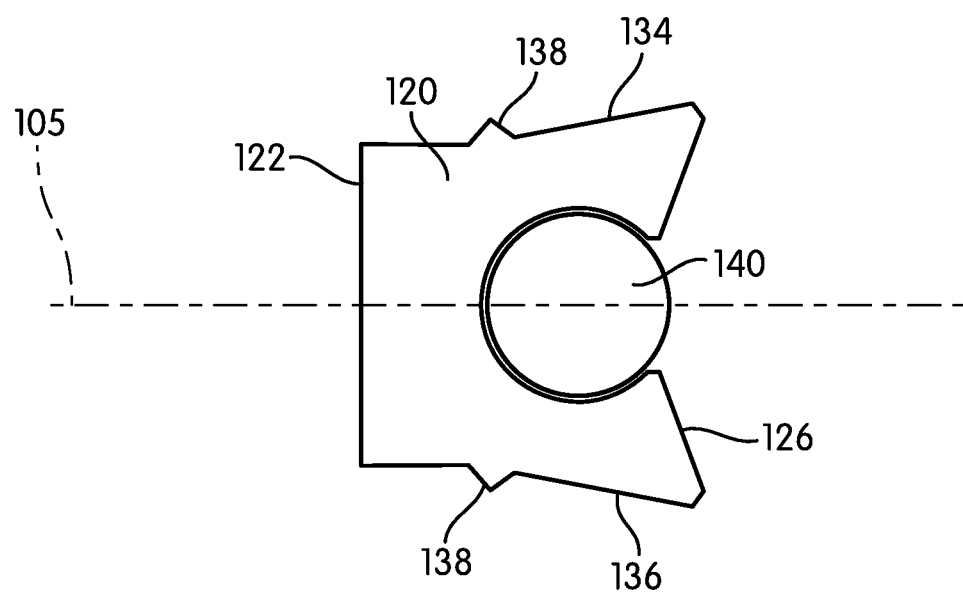
FIG. 29 shows the cross section of the seal pre-load structural ring (140) inserted within the seal pre-load cavity (128) of the seal (120) in an uncompressed state. The seal upper surface (134) and the seal lower surface (136) taper symmetrically along the seal radial axis (105). The tapering is partial as there are segments in the seal upper surface (134) and the seal lower surface (136) where there is no taper. The seal upper surface (134) and the seal lower surface (136) have two annular ridges (138) with a triangular cross section. The cross section of the seal outer diameter surface (122) is flat.

FIG. 28 shows the cross section of the seal pre-load structural ring (140) inserted within the seal pre-load cavity (128) of the seal (120) in an uncompressed state. The seal upper surface (134) and the seal lower surface (136) taper symmetrically along the seal radial axis (105). The tapering is partial as there are segments in the seal upper surface (134) and the seal lower surface (136) where there is no taper. The seal upper surface (134) and the seal lower surface (136) have an annular ridge (138) with a concave cross section. The cross section of the seal outer diameter surface (122) is flat. FIG. 29 shows the cross section of the seal pre-load structural ring (140) inserted within the seal pre-load cavity (128) of the seal (120) in an uncompressed state. The seal upper surface (134) and the seal lower surface (136) taper symmetrically along the seal radial axis (105). The tapering is partial as there are segments in the seal upper surface (134) and the seal lower surface (136) where there is no taper. The seal upper surface (134) and the seal lower surface (136) have two annular ridges (138) with a triangular cross section. The cross section of the seal outer diameter surface (122) is flat.

Figure 30:
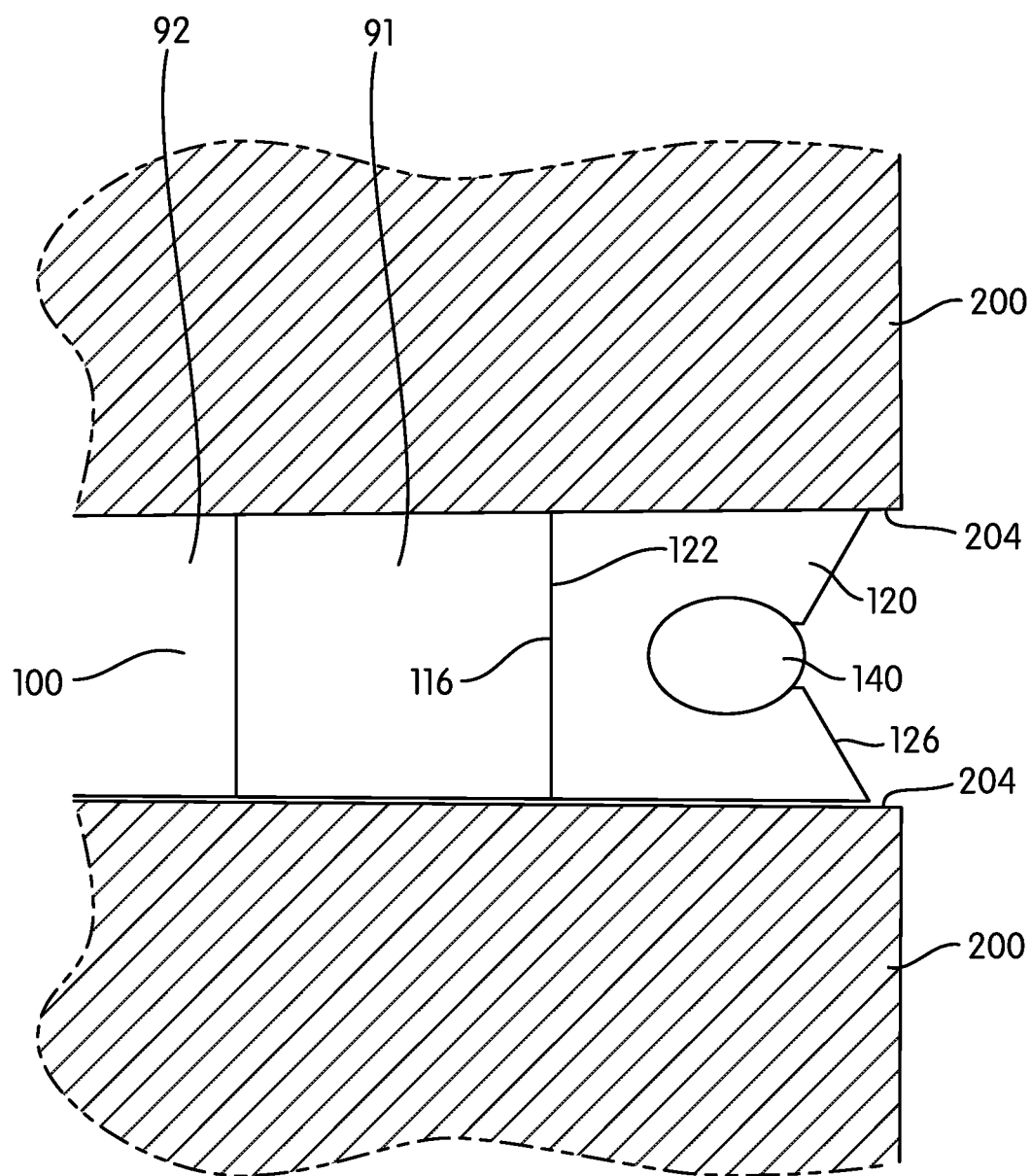
FIG. 30 shows the cross section of the composite gasket blank (160) comprising of the retainer (100) and the seal (120) placed under compression between the flange faces (204) of the flanges (200). The seal outer diameter surface (122) and the retainer inner diameter surface (116) are thermal fusion bonded. The seal pre-load structural ring (140) is inserted into the seal pre-load cavity (128). The seal outer diameter surface (122) has a flat profile. The retainer inner diameter surface (116) has a flat profile. A first layer of material made from cured filament wound material (91) and a second layer of material made from cured convolute wrapped pre-preg material (92) are shown within the retainer (100).

FIG. 30 shows the cross section of the composite gasket blank (160) comprising of the retainer (100) and the seal (120) placed under compression between the flange faces (204) of the flanges (200). The seal outer diameter surface (122) and the retainer inner diameter surface (116) are thermal fusion bonded. The seal pre-load structural ring (140) is inserted into the seal pre-load cavity (128). The seal outer diameter surface (122) has a flat profile. The retainer inner diameter surface (116) has a flat profile. A first layer of material made from cured filament wound material (91) and a second layer of material made from cured convolute wrapped pre-preg material (92) are shown within the retainer (100).

Figure 31:
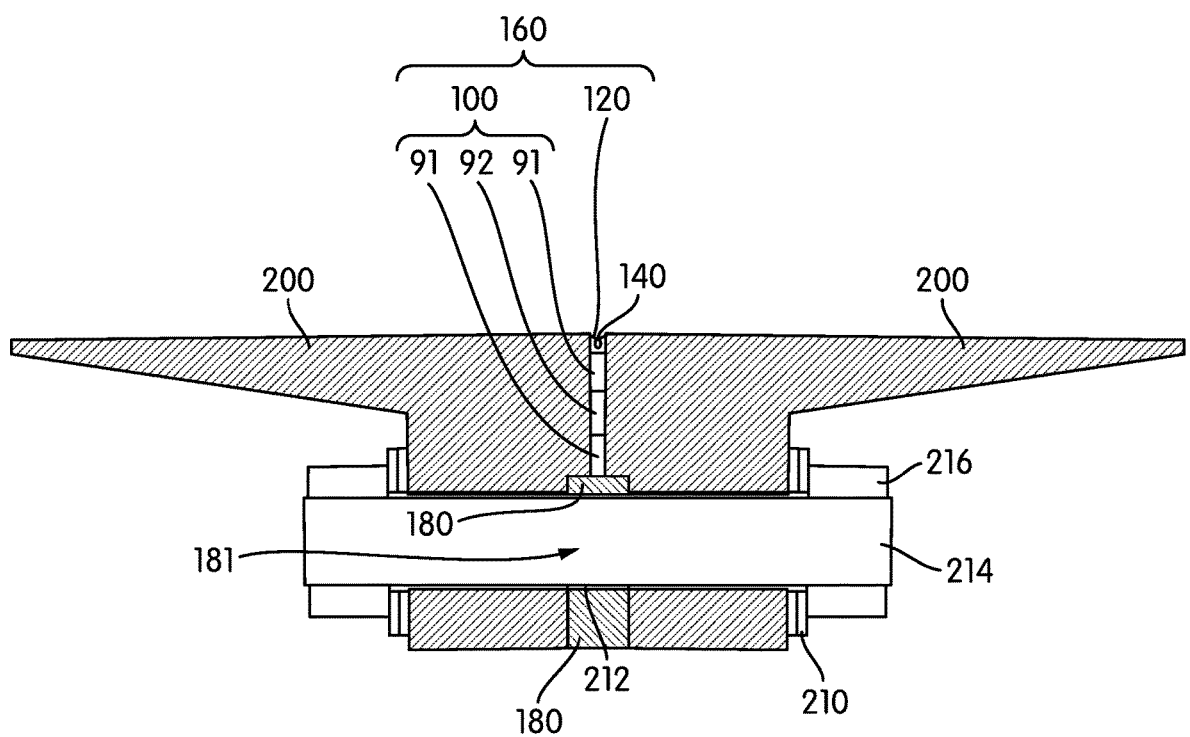
FIG. 31 shows a cross section of one side of a non-metallic flange isolation kit joining two flanges (200). A composite gasket blank (160) is placed between the two flanges (200). The seal (120) and the retainer (100) are thermal fusion bonded. The retainer (100) is comprised of a first layer of material made from cured filament wound material (91), a second layer of material made from cured convolute wrapped pre-preg material (92), and a third layer of material made from cured filament wound material (91). The seal pre-load structural ring (140) is inserted into the seal (120). A gasket seating stress stabilizer (180) is placed between the flanges (200). The bolt (214) goes through the gasket seating stress stabilizer hole (181). The flanges (200) are fastened together using bolts (214), nuts (216), washers (210), and bolt sleeves (212).

FIG. 31 shows a cross section of one side of a non-metallic flange isolation kit joining two flanges (200). A composite gasket blank (160) is placed between the two flanges (200). The seal (120) and the retainer (100) are thermal fusion bonded. The retainer (100) is comprised of a first layer of material made from cured filament wound material (91), a second layer of material made from cured convolute wrapped pre-preg material (92), and a third layer of material made from cured filament wound material (91). The seal pre-load structural ring (140) is inserted into the seal (120). A gasket seating stress stabilizer (180) is placed between the flanges (200). The bolt (214) goes through the gasket seating stress stabilizer hole (181). The flanges (200) are fastened together using bolts (214), nuts (216), washers (210), and bolt sleeves (212).

(4) Gasket Seating Stabilizers

The non-metallic flange isolation gasket kit may further comprise one or more gasket seating stress stabilizers (180). Gasket seating stress stabilizers (180) are used to control bolt load, flange parallelism, flange rotation, and seal seating pre-load. The gasket seating stress stabilizers (180) are placed between the flanges (200). The gasket seating stress stabilizers (180) are made from non-metallic materials to prevent electrical conductivity between the flanges (200). Gasket seating stress stabilizers (180) may be used with either the retainer (100) or the composite gasket blank (160). Gasket seating stress stabilizers (180) prevent the bolts (214) from over compressing either the retainer (100) or the composite gasket blank (160).

A gasket seating stress stabilizer (180) may be designed as a gasket seating stress bushing (182), a gasket seating stress annular block (184), or a gasket seating stress annular block segment (186), among others.

The gasket seating stress bushing (182) may have one or more gasket seating stress stabilizer holes (181). The gasket seating stress annular block (184) may have one or more gasket seating stress stabilizer holes (181). The gasket seating stress annular block segment (186) may have one or more gasket seating stress stabilizer holes (181). A bolt (214) may go through the gasket seating stress stabilizer hole (181).

FIG. 31 shows a cross section of one side of a non-metallic flange isolation kit joining two flanges (200). A composite gasket blank (160) is placed between the two flanges (200). The seal (120) and the retainer (100) are thermal fusion bonded. The retainer (100) is comprised of a first layer of material made from cured filament wound material (91), a second layer of material made from cured convolute wrapped pre-preg material (92), and a third layer of material made from cured filament wound material (91). The seal pre-load structural ring (140) is inserted into the seal (120). The gasket seating stress stabilizer (180) is placed between the flanges (200). The bolt (214) goes through the gasket seating stress stabilizer hole (181). The flanges (200) are fastened together using bolts (214), nuts (216), washers (210), and bolt sleeves (212).

A gasket seating stress stabilizer (180) may be designed as a gasket seating stress bushing (182). A gasket seating stress bushing (182) is tube-like in shape. A bolt (214) may go through the gasket seating stress stabilizer hole (181) of the gasket seating stress bushing (182), holding the gasket seating stress bushing (182) in place. When a retainer is used, one or more gasket seating stress bushings (182) secure the retainer (100) in place so that the retainer (100) maintains its place during flange sealing and pipeline operation. The gasket seating stress bushing outer diameter surface (192) comes in contact with the retainer outer diameter surface (114). When a composite gasket blank (160) is used, one or more gasket seating stress bushings (182) secure the composite gasket blank (160) in place so that the composite gasket blank (160) maintains its place during flange sealing and pipeline operation. The gasket seating stress bushing outer diameter surface (192) comes in contact with the composite gasket blank outer diameter surface (162).

Figure 32:
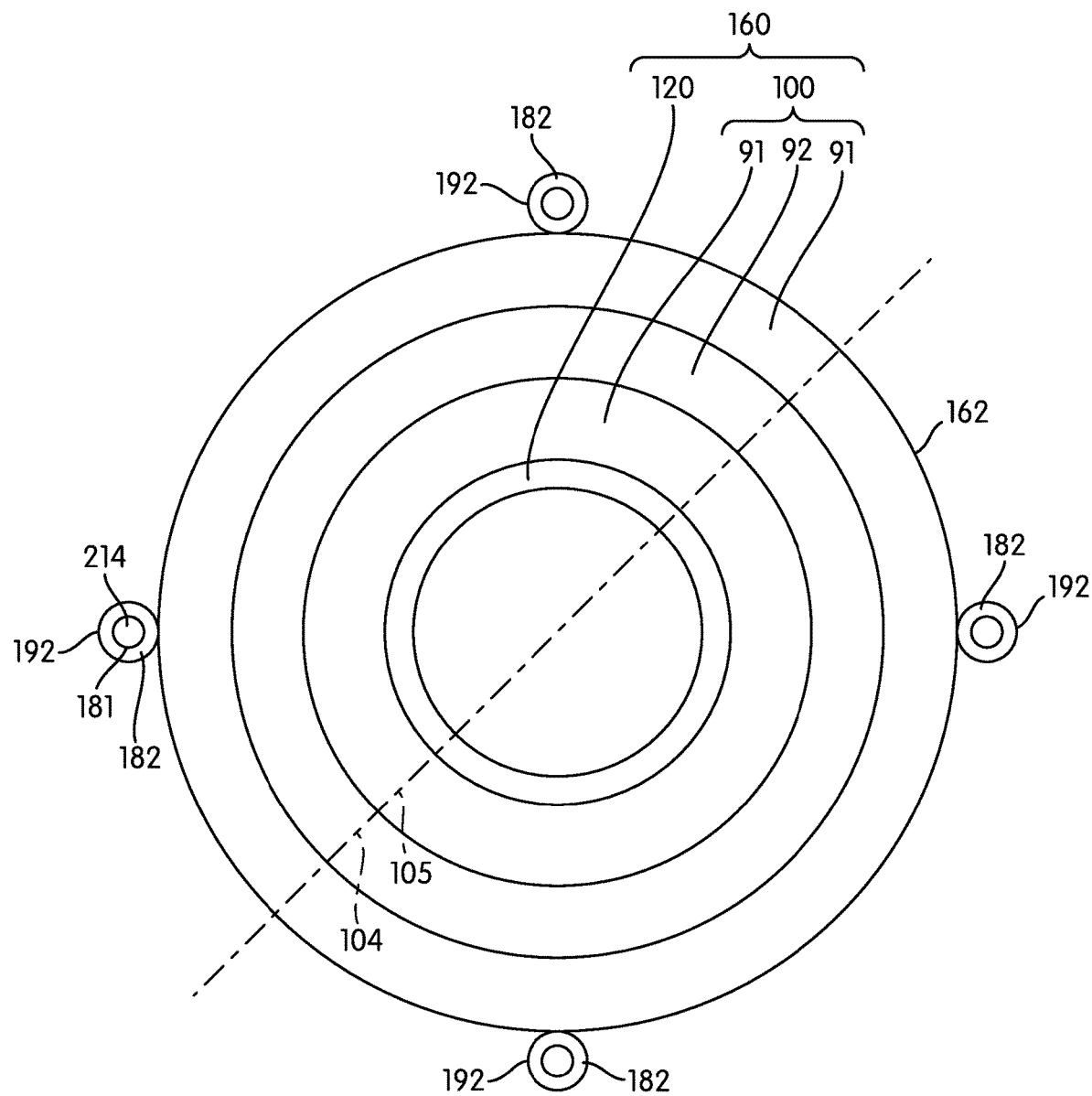
FIG. 32 is a top view of the composite gasket blank (160), where the retainer (100) and the seal (120) are thermal fusion bonded. The retainer (100) is comprised of a first layer of material made from cured filament wound material (91), a second layer of material made from cured convolute wrapped pre-preg material (92), and a third layer of material made from cured filament wound material (91). Four gasket seating stress bushings (182) secure the composite gasket blank (160). The gasket seating stress bushing outer diameter surface (192) comes in contact with the composite gasket blank outer diameter surface (162). The bolts (214) go through the gasket seating stress stabilizer holes (181) of the gasket seating stress bushings (182), holding the gasket seating stress bushings (182) in place. The retainer radial axis (104) and the seal radial axis (105) are shown for reference purposes.

FIG. 32 is a top view of the composite gasket blank (160), where the retainer (100) and the seal (120) are thermal fusion bonded. The retainer (100) is comprised of a first layer of material made from cured filament wound material (91), a second layer of material made from cured convolute wrapped pre-preg material (92), and a third layer of material made from cured filament wound material (91). Four gasket seating stress bushings (182) secure the composite gasket blank (160). The gasket seating stress bushing outer diameter surface (192) comes in contact with the composite gasket blank outer diameter surface (162). The bolts (214) go through the gasket seating stress stabilizer holes (181) of the gasket seating stress bushings (182), holding the gasket seating stress bushings (182) in place. The retainer radial axis (104) and the seal radial axis (105) are shown for reference purposes.

The gasket seating stress bushing outer diameter surface (192) is preferably circular but may have other shapes. FIG. 33 shows a top view of the gasket seating stress bushing (182) that is circular in shape. The gasket seating stress bushing (182) has a gasket seating stress stabilizer hole (181). FIG. 33a shows a sectional view of the top view of the gasket seating stress bushing (182) that is circular in shape of FIG. 33 taken at the sectioning plane and in the direction indicated by section lines 33a-33a.

To accommodate various retainer (100) and composite gasket blank (160) diameters, the size and shape of the gasket seating stress bushings (182) may be modified. In this way, the retainer (100) and composite gasket blank (160) diameters may be standardized and these modified gasket seating stress bushings (182) compensate for variable flange sizes. For instance, a segment may be cut off from a circular gasket seating stress bushing (182), creating a flat surface, the segment-less gasket seating stress bushing (188). A segment is defined as a part of a circle bounded by an arc and a line segment joining the arc's endpoints. This flat surface enables for smaller flanges to be fitted with a specific retainer (100) and composite gasket blank (160) outer diameter. FIG. 34 shows a top view of the segment-less gasket seating stress bushing (188). FIG. 34a shows a sectional view of the top view of the segment-less gasket seating stress bushing (188) of FIG. 34 taken at the sectioning plane and in the direction indicated by section lines 34a-34a.

Gasket seating stress stabilizers (180) can also be designed as a gasket seating stress annular block (184), in the shape of an annulus, the region in a plane between two concentric circles of different radius. The gasket seating stress stabilizer holes (181) of the gasket seating stress annular block (184) are designed to accommodate the circumference, placement and number of the bolts (214) used to fasten the flanges (200) together. Additional gasket seating stress stabilizer holes (181) may exist to create universal bolt configurations. The gasket seating stress annular block (184) is made in one segment. This one segment configuration is suited for new installations. Thus, the function of the gasket seating stress stabilizers (180) can be performed using a single piece rather than multiple gasket seating stress bushings (182). The gasket seating stress annular block (184) can secure either the retainer (100) or the composite gasket blank (160). Depending on the configuration, the gasket seating stress annular block inner diameter surface (197) secures either the composite gasket blank outer diameter surface (162) or the centering ring outer diameter surface (152).

Figure 35:
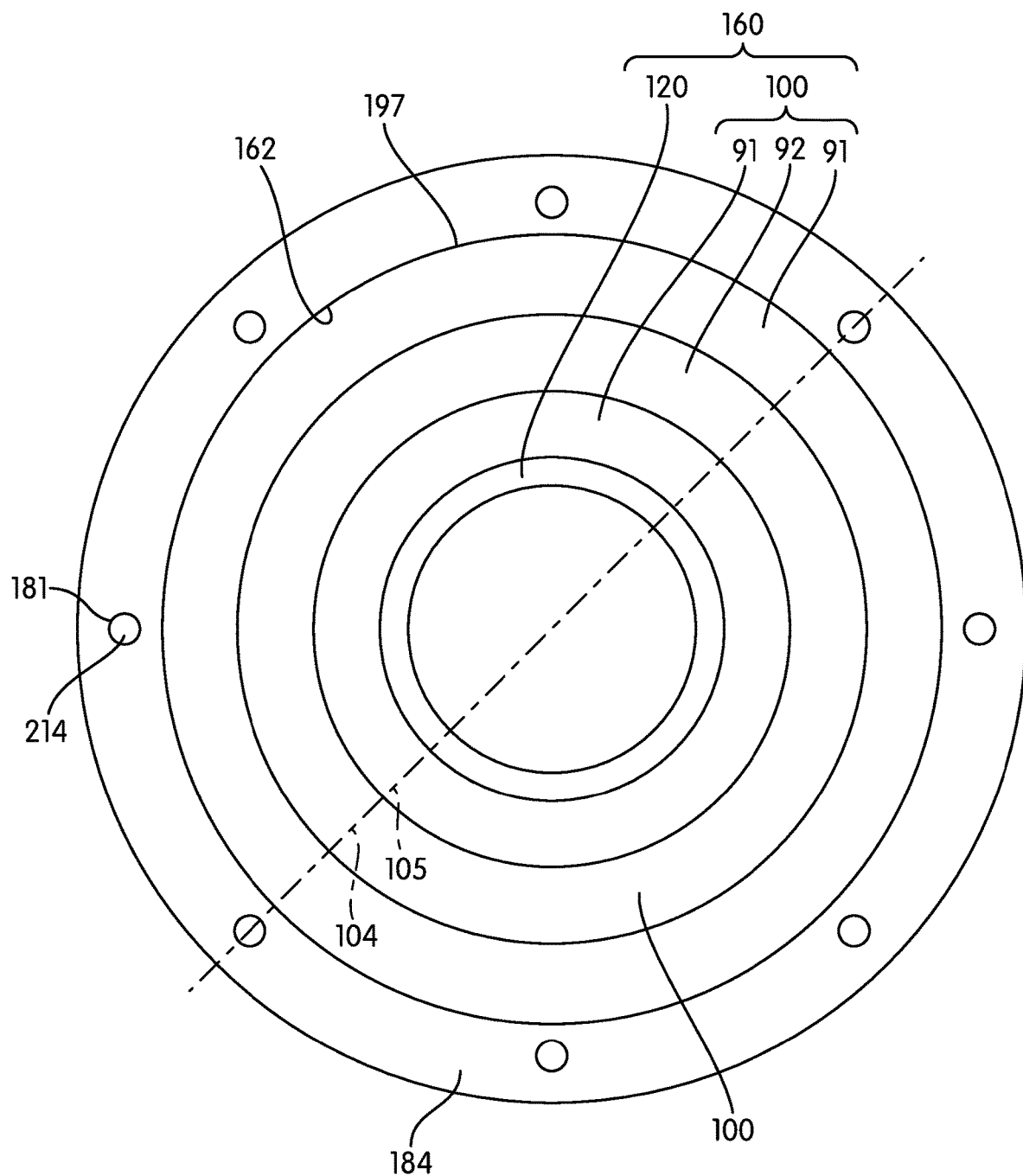
FIG. 35 is a top view of the composite gasket blank (160), where the retainer (100) and the seal (120) are thermal fusion bonded. The retainer (100) is comprised of a first layer of material made from cured filament wound material (91), a second layer of material made from cured convolute wrapped pre-preg material (92), and a third layer of material made from cured filament wound material (91). The gasket seating stress annular block inner diameter surface (197) secures the composite gasket blank outer diameter surface (162). The bolts (214) go through the gasket seating stress stabilizer holes (181) of gasket seating stress annular block (184). The retainer radial axis (104) and the seal radial axis (105) are shown for reference purposes.

FIG. 35 is a top view of the composite gasket blank (160), where the retainer (100) and the seal (120) are thermal fusion bonded. The retainer (100) is comprised of a first layer of material made from cured filament wound material (91), a second layer of material made from cured convolute wrapped pre-preg material (92), and a third layer of material made from cured filament wound material (91). The gasket seating stress annular block inner diameter surface (197) secures the composite gasket blank outer diameter surface (162). The bolts (214) go through the gasket seating stress stabilizer holes (181) of gasket seating stress annular block (184). The retainer radial axis (104) and the seal radial axis (105) are shown for reference purposes.

To accommodate for different flange diameter sizes, the size and shape of the gasket seating stress annular block (184) may be modified. In this way, the retainer (100) and composite gasket blank (160) outer diameters may be standardized, and these modified gasket seating stress annular blocks (184) compensate for variable flange sizes. For instance, the gasket seating stress annular block inner diameter (195) may be decreased relative to the gasket seating stress annular block outer diameter (194). In other words, the distance between the center of the gasket seating stress stabilizer holes (181) and the gasket seating stress annular block outer diameter (194) may be different than the distance between the center of the gasket seating stress stabilizer holes (181) and the gasket seating stress annular block inner diameter (195) along the gasket seating stress annular block radial axis (190).

Figure 36:
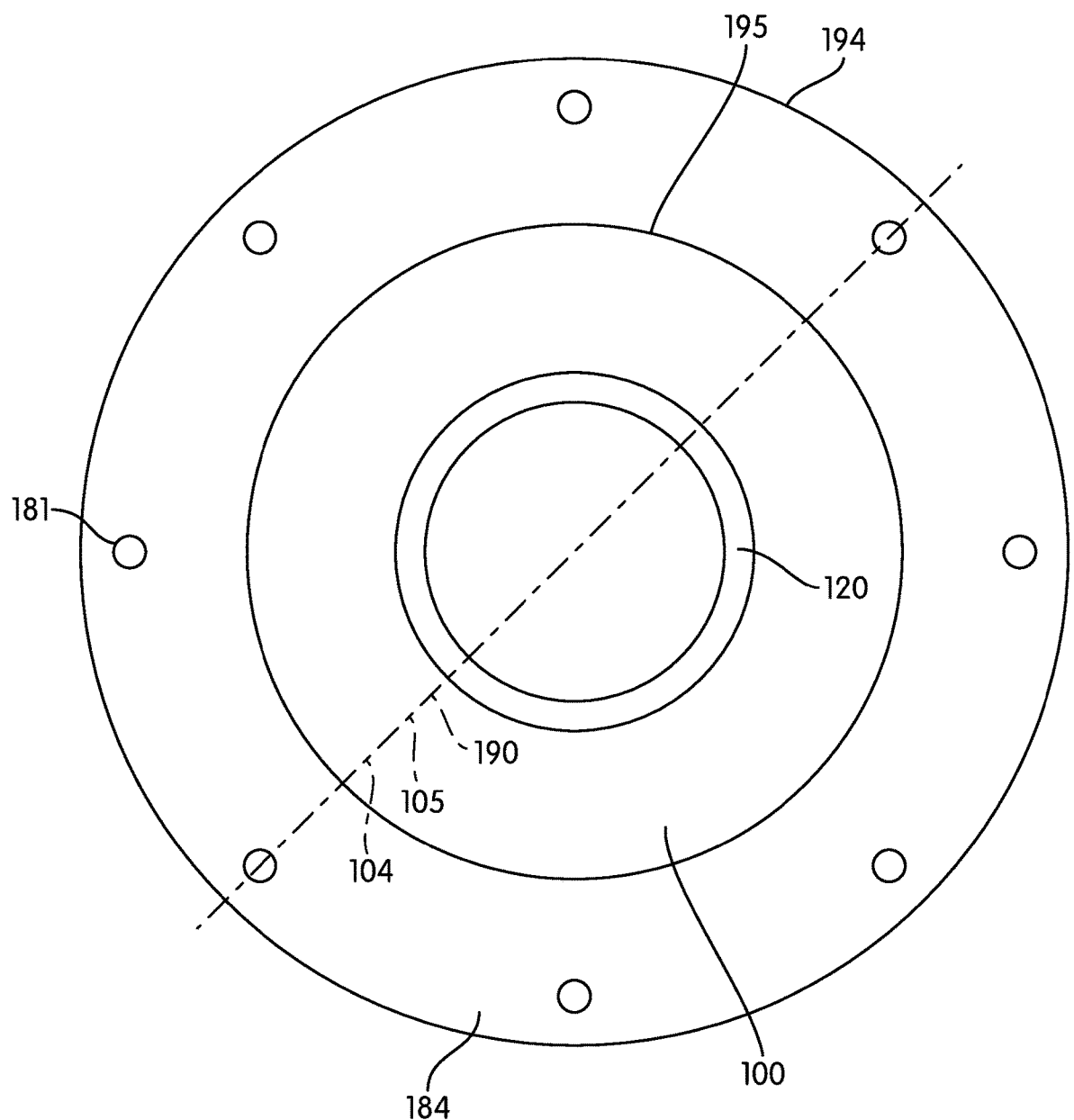
FIG. 36 shows the gasket seating stress annular block (184) where the distance between the center of the gasket seating stress stabilizer holes (181) and the gasket seating stress annular block outer diameter (196) is smaller than the distance between the center of the gasket seating stress stabilizer holes (181) and the gasket seating stress annular block inner diameter (195) along the gasket seating stress annular block radial axis (190).

FIG. 36 shows the gasket seating stress annular block (184) where the distance between the center of the gasket seating stress stabilizer holes (181) and the gasket seating stress annular block outer diameter (196) is smaller than the distance between the center of the gasket seating stress stabilizer holes (181) and the gasket seating stress annular block inner diameter (195) along the gasket seating stress annular block radial axis (190).

The gasket seating stress annular block (184) may be made in a plurality of pieces, that is, gasket seating stress annular block segments (186). For example, the gasket seating stress annular block segments (186) may be made in two semi-circular segments, that look like half-moons.

(5) Centering Ring

The non-metallic flange isolation gasket kit may further comprise a centering ring (150). The centering ring (150) is made from non-metallic materials to prevent electrical conductivity between the flanges (200). The centering ring (150) may be used with either the retainer (100) or the composite gasket blank (160). The centering ring (150) may also be used with gasket seating stress stabilizers (180) and either the retainer (100) or the composite gasket blank (160). The centering ring (150) secures the composite gasket blank (160) or the retainer (100) in place so that the composite gasket blank (160) or the retainer (100) maintain their place during flange sealing and pipeline operation. The centering ring inner diameter surface (154) is secured against the retainer outer diameter surface (114) or composite gasket blank outer diameter surface (162).

There are two benefits for the use of a centering ring with in a non-metallic flange isolation gasket kit. First, the non-metallic materials used to make the centering ring (150) are cheaper to manufacture relative to the cost of manufacturing the composite gasket blank (160) or the retainer (100). By adding a centering ring (150) and shrinking the size of either the composite gasket blank (160) or the retainer (100), it will allow for substantial manufacturing costs efficiencies. The use of the centering ring (150) will not compromise the reliability of the non-metallic flange isolation gasket kit. Second, the retainer (100) and composite gasket blank (160) outer diameters may be standardized, and the size of the centering ring (150) may be modified to accommodate variable flange sizes. The insertion of the centering ring (150) allows for the use of the composite gasket blank (160) or the retainer (100) with a certain outer diameter in a larger range of flange sizes.

Figure 37:
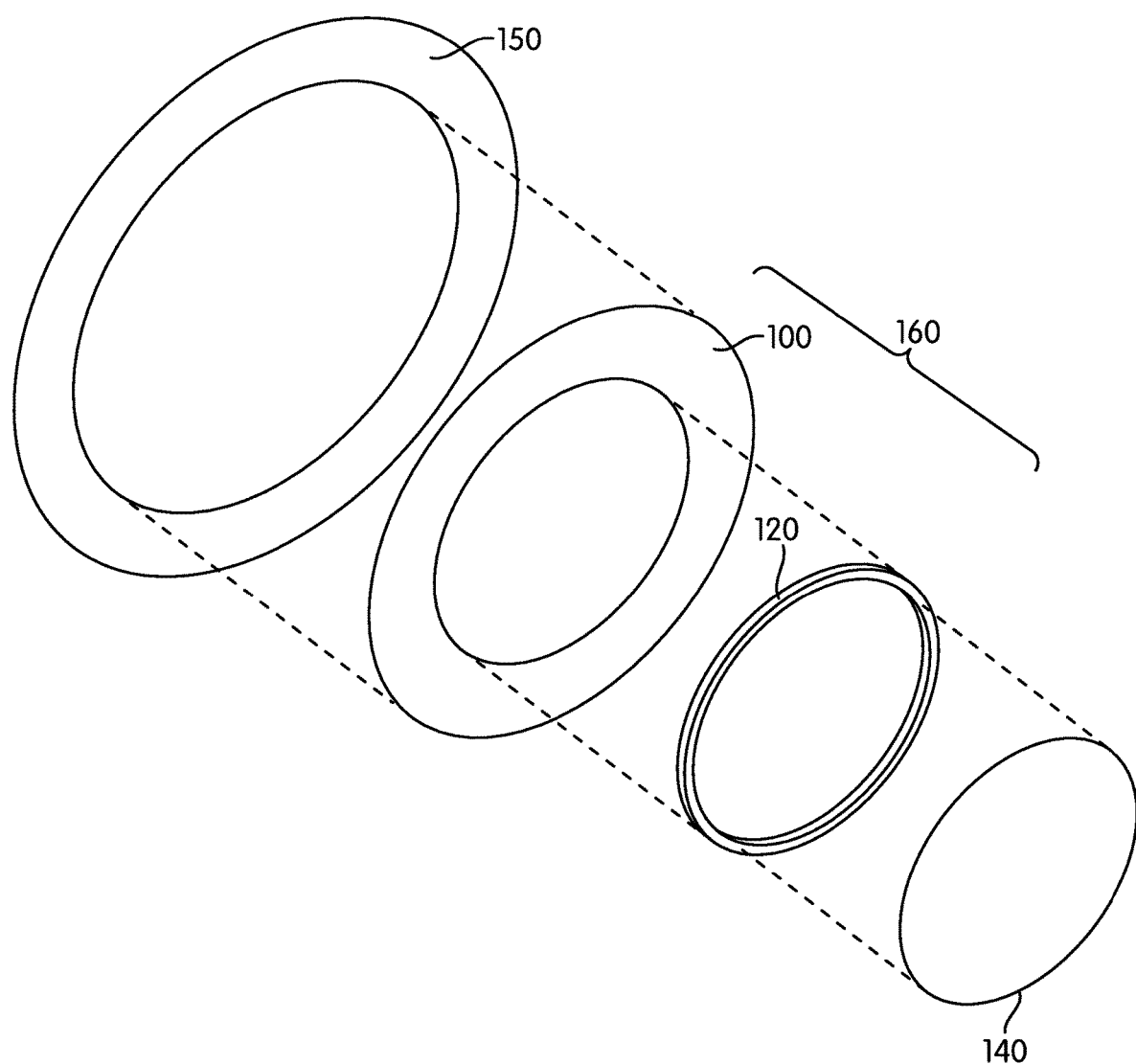
FIG. 37 shows the relative positioning of the centering ring (150), the composite gasket blank (160) comprised of the retainer (100) and the seal (120), and the seal pre-load structural ring (140).

FIG. 37 shows the relative positioning of the centering ring (150), the composite gasket blank (160) comprised of the retainer (100) and the seal (120), and the seal pre-load structural ring (140).

Figure 38:
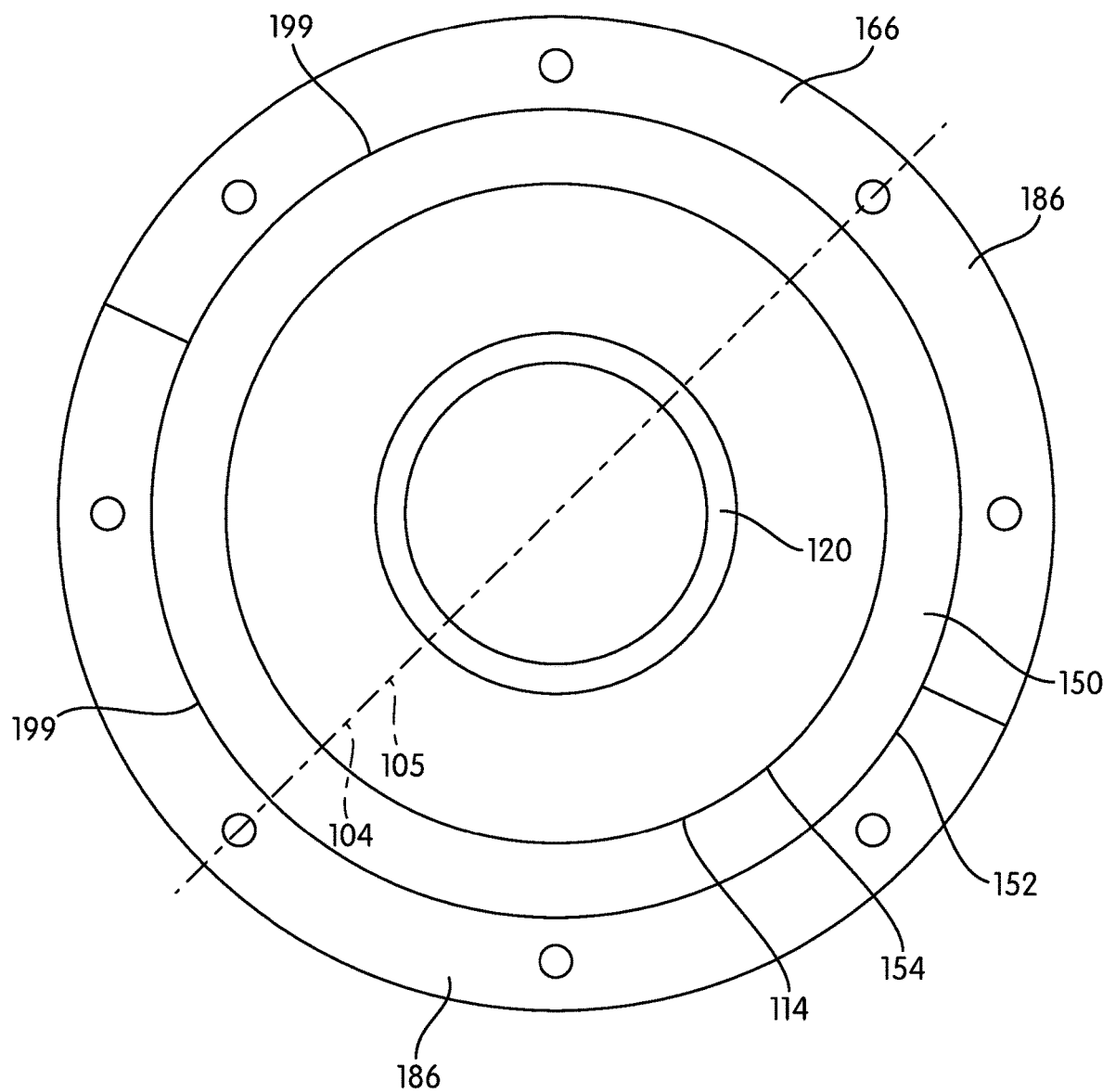
FIG. 38 is a top view of the retainer (100) joined to the seal (120). Two stress annular block segments (186) secure the centering ring (150), and the centering ring (150) secures the retainer (100). The gasket seating stress annular block segment inner diameter surface (199) secures the centering ring outer diameter surface (152). The centering ring inner diameter surface (154) secures the retainer outer diameter surface (114). The retainer radial axis (104) and the seal radial axis (105) are shown for reference purposes.

FIG. 38 is a top view of the retainer (100) joined to the seal (120). Two gasket seating stress annular block segments (186) secure the centering ring (150), and the centering ring (150) secures the retainer (100). The gasket seating stress annular block segment inner diameter surface (199) secures the centering ring outer diameter surface (152). The centering ring inner diameter surface (154) secures the retainer outer diameter surface (114). The retainer radial axis (104) and the seal radial axis (105) are shown for reference purposes.

Figure 39:
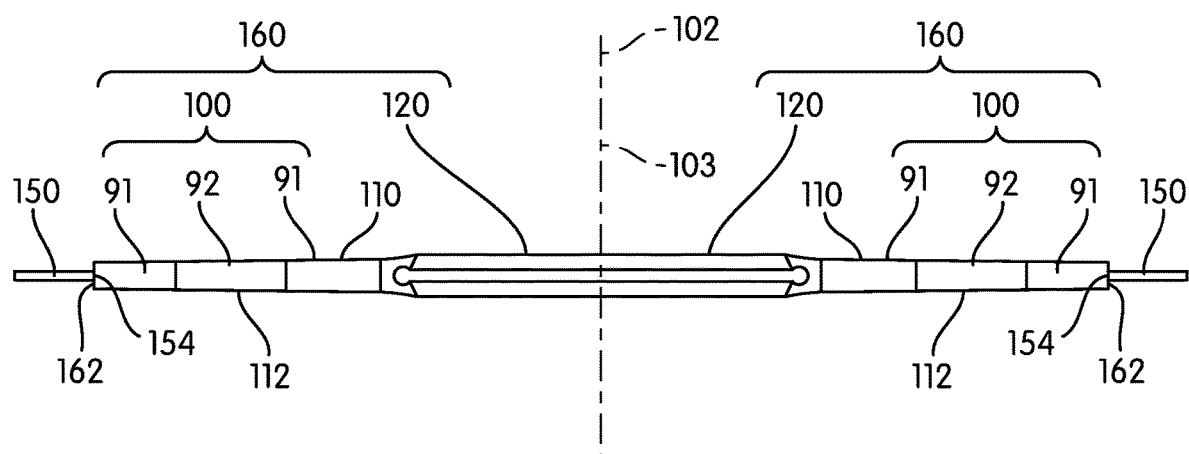
FIG. 39 shows a cross sectional view of the composite gasket blank (160), where the retainer (100) and the seal (120) are thermal fusion bonded. The retainer (100) is comprised of a first layer of material made from cured filament wound material (91), a second layer of material made from cured convolute wrapped pre-preg material (92), and a third layer of material made from cured filament wound material (91). The centering ring (150) secures the composite gasket blank (160). The centering ring inner diameter surface (154) secures the composite gasket blank outer diameter surface (162). The retainer central axis (102) and the seal central axis (103) are shown for reference purposes.

FIG. 39 shows a cross sectional view of the composite gasket blank (160), where the retainer (100) and the seal (120) are thermal fusion bonded. The retainer (100) is comprised of a first layer of material made from cured filament wound material (91), a second layer of material made from cured convolute wrapped pre-preg material (92), and a third layer of material made from cured filament wound material (91). The centering ring (150) secures the composite gasket blank (160). The centering ring inner diameter surface (154) secures the composite gasket blank outer diameter surface (162). The retainer central axis (102) and the seal central axis (103) are shown for reference purposes.

Figure 40:
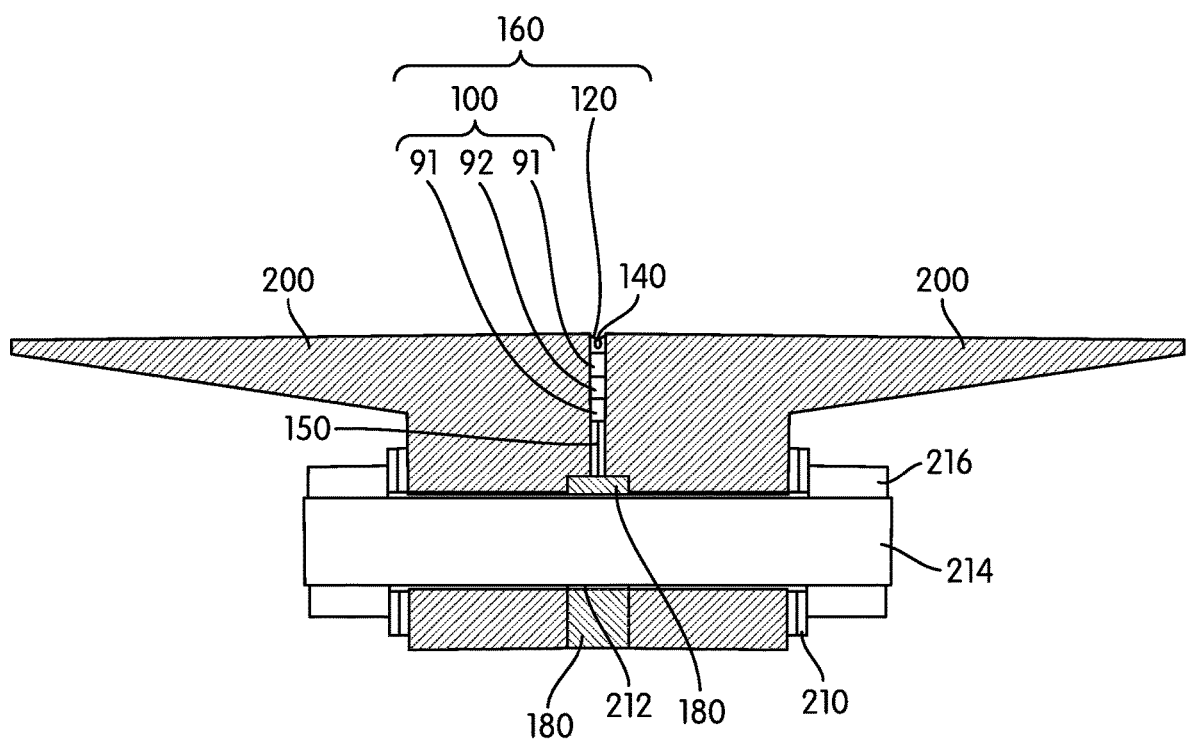
FIG. 40 shows a cross section of one side of a non-metallic flange isolation kit joining two flanges (200) using a composite gasket blank (160), where the retainer (100) and the seal (120) are thermal fusion bonded. The retainer (100) is comprised of a first layer of material made from cured filament wound material (91), a second layer of material made from cured convolute wrapped pre-preg material (92), and a third layer of material made from cured filament wound material (91). The centering ring (150) secures the composite gasket blank (160). The centering ring (150) is secured by the gasket seating stress stabilizer (180). The flanges (200) are fastened together using bolts (214), nuts (216), washers (210), and bolt sleeves (212).

FIG. 40 shows a cross section of one side of a non-metallic flange isolation kit joining two flanges (200) using a composite gasket blank (160), where the retainer (100) and the seal (120) are thermal fusion bonded. The retainer (100) is comprised of a first layer of material made from cured filament wound material (91), a second layer of material made from cured convolute wrapped pre-preg material (92), and a third layer of material made from cured filament wound material (91). The centering ring (150) secures the composite gasket blank (160). The centering ring (150) is secured by the gasket seating stress stabilizer (180). The flanges (200) are fastened together using bolts (214), nuts (216), washers (210), and bolt sleeves (212).

While the foregoing written description of the invention enables a person having ordinary skill in the art to make and use what is considered presently to be the best mode thereof, those of ordinary skill in the art will understand and appreciate the existence of variations, combinations, and equivalents of the specific embodiment, process, and examples herein. The invention should therefore not be limited by the above described embodiment, process, and examples, but by all embodiments and processes within the scope and spirit of the invention.

We claim:

1. An improved flange isolation gasket kit for sealing flanged pipeline connections, comprising:
   (a) a composite gasket blank, comprising:
      (i) a retainer, comprising,
         (1) a tapered upper surface;
         (2) a tapered lower surface;
         (3) a retainer outer diameter surface;
         (4) a retainer inner diameter surface;
         (5) a retainer thickness; and
         (6) a central bore;
         (7) where the retainer thickness tapers from the retainer inner diameter surface towards the retainer outer diameter surface,
      (ii) a seal, comprising,
         (1) pores;
         (2) a seal outer diameter surface;
         (3) a seal inner diameter surface, comprising:
            (a) an upper facing surface;
            (b) a lower facing surface; and
            (c) a seal pre-load cavity;
            (d) where the seal pre-load cavity forms a concave indentation within the seal inner diameter surface concentric to the seal central axis,
         (4) a seal upper surface;
         (5) a seal lower surface; and
         (6) a seal thickness;
   (b) a seal pre-load structural ring;
      (i) where the seal pre-load structural ring is made out of materials with elastic properties,
      (ii) where the seal pre-load structural ring is inserted within the seal pre-load cavity,
   (c) wherein the retainer is made from one or more layers of cured filament wound material and one or more layers of cured convolute wrapped pre-preg material;
   (d) wherein the cured filament wound material comprises resin and composite fiber filaments;
   (e) wherein the cured convolute wrapped pre-preg material comprises resin and composite fabric matrix;
   (f) where the pores within the seal outer diameter surface of the seal contain the resin from the retainer;
   (g) a gasket seating stress stabilizer, comprising:
      (i) A gasket seating stress stabilizer hole;
   (h) where the gasket seating stress stabilizer secures the retainer outer diameter surface.

2. The improved flange isolation gasket kit of claim 1, wherein the gasket seating stress stabilizer further comprises a gasket seating stress bushing.

3. The improved flange isolation gasket kit of claim 1, wherein the gasket seating stress stabilizer further comprises a gasket seating stress annular block.

4. The improved flange isolation gasket kit of claim 1, wherein the gasket seating stress stabilizer further comprises a plurality of gasket seating stress annular block segments.

5. An improved flange isolation gasket kit for sealing flanged pipeline connections, comprising:
   (a) a composite gasket blank, comprising:
      (i) a retainer, comprising,
         (1) a tapered upper surface;
         (2) a tapered lower surface;
         (3) a retainer outer diameter surface;
         (4) a retainer inner diameter surface:
         (5) a retainer thickness; and
         (6) a central bore;
         (7) where the retainer thickness tapers from the retainer inner diameter surface towards the retainer outer diameter surface, (ii) a seal, comprising,
  (1) pores;
  (2) a seal outer diameter surface;
  (3) a seal inner diameter surface, comprising:
    (a) an upper facing surface;
    (b) a lower facing surface; and
    (c) a seal pre-load cavity;
    (d) where the seal pre-load cavity forms a concave indentation within the seal inner diameter surface concentric to the seal central axis,
  (4) a seal upper surface;
  (5) a seal lower surface; and
  (6) a seal thickness,
(b) a seal pre-load structural ring;
  (i) where the seal pre-load structural ring is made out of materials with elastic properties,
  (ii) where the seal pre-load structural ring is inserted within the seal pre-load cavity,
(c) wherein the retainer is made from one or more layers of cured filament wound material and one or more layers of cured convolute wrapped pre-preg material;
(d) wherein the cured filament wound material comprises resin and composite fiber filaments;
(e) wherein the cured convolute wrapped pre-preg material comprises resin and composite fabric matrix;
(f) where the pores within the seal outer diameter surface of the seal contain the resin from the retainer;
(g)
(h) a centering ring, the centering ring comprising of an outer diameter surface and an inner diameter surface; and
(i) a gasket seating stress stabilizer, comprising:
  (i) a gasket seating stress stabilizer hole;
(j) where the centering ring secures the retainer outer diameter surface,
(k) where the gasket seating stress stabilizer secures the centering ring outer diameter surface.

6. The improved flange isolation gasket kit of claim 5, wherein the gasket seating stress stabilizer further comprises a gasket seating stress bushing.

7. The improved flange isolation gasket kit of claim 5, wherein the gasket seating stress stabilizer further comprises a gasket seating stress annular block.

8. The improved flange isolation gasket kit of claim 5, wherein the gasket seating stress stabilizer further comprises a plurality of gasket seating stress annular block segments.

* * * * *